(12) United States Patent
Ito

(10) Patent No.: US 11,227,429 B2
(45) Date of Patent: Jan. 18, 2022

(54) IMAGE PROCESSING APPARATUS, METHOD AND STORAGE MEDIUM FOR GENERATING A VIRTUAL VIEWPOINT WITH REDUCED IMAGE DATA

(71) Applicant: CANON KABUSHIKI KAISHA, Tokyo (JP)

(72) Inventor: Hironao Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/421,576

(22) Filed: May 24, 2019

(65) Prior Publication Data

US 2019/0378326 A1    Dec. 12, 2019

(30) Foreign Application Priority Data

Jun. 11, 2018    (JP) .............................. JP2018-111163

(51) Int. Cl.
*H04N 13/117*    (2018.01)
*G06T 15/10*    (2011.01)
(Continued)

(52) U.S. Cl.
CPC .............. *G06T 15/10* (2013.01); *G06T 19/20* (2013.01); *H04N 13/106* (2018.05); *G06T 2207/10024* (2013.01); *G06T 2219/2021* (2013.01)

(58) Field of Classification Search
CPC ........ H04N 13/111–117; H04N 13/106; H04N 13/282; H04N 13/117; H04N 13/15;
(Continued)

(56) References Cited

U.S. PATENT DOCUMENTS 7,307,655 B1 * 12/2007 Okamoto ........... G06K 9/00791
348/222.1
8,073,190 B2    12/2011 Gloudemans
(Continued)

FOREIGN PATENT DOCUMENTS

JP    2008015756 A    1/2008
JP    2016026425 A    7/2016
(Continued)

OTHER PUBLICATIONS

Notice of Allowance and Search Report issued in Russian Appln. No 2019117607 dated May 20, 2020. Partial English translation provided.
(Continued)

*Primary Examiner* — Phong X Nguyen
(74) *Attorney, Agent, or Firm* — Rossi, Kimms & McDowell LLP

(57) ABSTRACT

In an image processing apparatus, three-dimensional shape data indicating a shape of an object is generated based on at least one of a plurality of images captured from different directions by a plurality image capturing devices. Color information indicating a color of each element of the three-dimensional shape data is generated based on the generated three-dimensional shape data and the plurality of images. The three-dimensional shape data and the color information are associated with each other and written to a storage unit as material data for generating a virtual viewpoint image corresponding to virtual viewpoint information indicating a virtual viewpoint.

21 Claims, 21 Drawing Sheets

(51) Int. Cl.
  *G06T 19/20* (2011.01)
  *H04N 13/106* (2018.01)
(58) Field of Classification Search
  CPC .... H04N 13/189; H04N 13/293; G06T 15/10;
      G06T 19/20; G06T 2207/10024; G06T
      2219/2021; G06T 15/20; G06T 15/04;
      G06T 17/00; G06T 19/00
  See application file for complete search history.

(56) References Cited

U.S. PATENT DOCUMENTS

| | | | |
|---|---|---|---|
| 8,823,797 B2 | 9/2014 | Chen | |
| 9,171,402 B1* | 10/2015 | Allen | G06T 15/20 |
| 9,858,640 B1* | 1/2018 | Earl | G06T 7/33 |
| 10,325,402 B1* | 6/2019 | Wang | G06T 15/20 |
| 2002/0158873 A1 | 10/2002 | Williamson | |
| 2005/0117019 A1* | 6/2005 | Lamboray | G06T 9/00 |
| | | | 348/159 |
| 2009/0315978 A1* | 12/2009 | Wurmlin | G06T 7/20 |
| | | | 348/43 |
| 2011/0115921 A1* | 5/2011 | Wang | G06T 7/90 |
| | | | 348/187 |
| 2012/0033038 A1* | 2/2012 | Cho | H04N 13/111 |
| | | | 348/43 |
| 2012/0141016 A1* | 6/2012 | Wildeboer | H04N 13/271 |
| | | | 382/154 |
| 2016/0301908 A1* | 10/2016 | Itakura | H04N 13/243 |
| 2017/0316606 A1* | 11/2017 | Khalid | G06F 3/011 |
| 2018/0047208 A1* | 2/2018 | Marin | H04N 13/243 |
| 2018/0061086 A1* | 3/2018 | Yoshimura | G06T 17/00 |
| 2018/0350134 A1* | 12/2018 | Lodato | G06T 17/00 |
| 2018/0350146 A1* | 12/2018 | Gervasio | H04N 21/21805 |
| 2019/0073823 A1* | 3/2019 | Nakajo | G06F 9/06 |
| 2019/0304164 A1* | 10/2019 | Zhang | G06T 15/08 |
| 2019/0311526 A1* | 10/2019 | Sugio | H04N 13/117 |
| 2020/0051323 A1 | 2/2020 | Araki | |

FOREIGN PATENT DOCUMENTS

| | | |
|---|---|---|
| RU | 2282946 C2 | 8/2006 |
| RU | 2012151489 A | 6/2014 |
| WO | 2004114224 A1 | 12/2004 |
| WO | 2018074252 A1 | 4/2018 |

OTHER PUBLICATIONS

Office Action issued in Korean Appln. No. 10-2019-0063549 dated Oct. 27, 2021. English translation provided.

* cited by examiner

| OBJECT THREE-DIMENSIONAL MODEL | | | |
|---|---|---|---|
| POINT COORDINATE ID | x(mm) | y(mm) | z(mm) |
| 0 | 50.00 | 45.00 | 5.00 |
| 1 | 55.00 | 50.00 | 5.00 |
| 2 | 60.00 | 55.00 | 5.00 |
| ⋮ | ⋮ | ⋮ | ⋮ |
| 1230 | −40.00 | −45.00 | 5.00 |
| 1231 | −45.00 | −45.00 | 5.00 |
| 1232 | −50.00 | −45.00 | 5.00 |

FIG.3

| POINT COORDINATE ID | COLOR INFORMATION ON OBJECT THREE-DIMENSIONAL MODEL | | | |
|---|---|---|---|---|
| | ID OF CAMERA OF IMAGE USED FOR COLOR INFORMATION | COLOR INFORMATION | | |
| | | R | G | B |
| 4000 | 112h | 128 | 128 | 128 |
| 4001 | 112i | 112 | 113 | 115 |
| ... | ... | ... | ... | ... |
| 5998 | 112a | 0 | 0 | 255 |
| 5999 | 112a | 0 | 0 | 255 |
| 6000 | 112b | 0 | 0 | 255 |

| POINT COORDINATE ID | COLOR CORRECTION INFORMATION ON OBJECT THREE-DIMENSIONAL MODEL |||||||
|---|---|---|---|---|---|---|---|
| | ID OF CAMERA OF IMAGE USED FOR COLOR CORRECTION INFORMATION 1 | COLOR CORRECTION INFORMATION 1 ||| ID OF CAMERA OF IMAGE USED FOR COLOR CORRECTION INFORMATION 2 | COLOR CORRECTION INFORMATION 2 |||
| | | R | G | B | | R | G | B |
| 4000 | 112f | 115 | 115 | 115 | 112j | 133 | 133 | 133 |
| 4001 | 112f | 100 | 99 | 112 | 112j | 120 | 123 | 122 |
| 4002 | 112g | 255 | 0 | 10 | 112k | 233 | 4 | 13 |
| ... | ... | ... | ... | ... | ... | ... | ... | ... |
| 5998 | 112c | 0 | 0 | 255 | — | — | — | — |
| 5999 | 112c | 0 | 0 | 255 | 112o | 0 | 0 | 233 |
| 6000 | 112d | 0 | 0 | 255 | 112p | 0 | 0 | 233 |

IMAGE PROCESSING APPARATUS, METHOD AND STORAGE MEDIUM FOR GENERATING A VIRTUAL VIEWPOINT WITH REDUCED IMAGE DATA

BACKGROUND OF THE INVENTION

Field of the Invention

The present invention relates to a technique to generate an image from a virtual viewpoint based on images captured from a plurality of viewpoints.

Description of the Related Art

In recent years, a technique has been attracting attention, which generates virtual viewpoint contents by performing synchronous image capturing at a plurality of viewpoints by installing a plurality of cameras at different positions and by using a plurality of images obtained by the image capturing. According to the technique to generate virtual viewpoint contents from a plurality of images, for example, it is made possible to view a highlight scene in soccer or basketball from a variety of angles, and therefore, it is possible to give a user a higher feeling of being at a live performance.

In order to generate and browse a virtual viewpoint image, image processing, such as concentration of image data captured by a plurality of cameras to a server or the like, generation of a three-dimensional model in the server or the like, and rendering, may be required. Japanese Patent Laid-Open No. 2008-15756 has disclosed a technique to generate an image from an arbitrary viewpoint on a real space close to the reality from images of a plurality of cameras by adjusting camera parameter and images in accordance with each local area obtained by dividing the real space.

However, with the technique of Japanese Patent Laid-Open No. 2008-15756 described above, a virtual viewpoint image is generated by using images of a plurality of cameras, and therefore, there is such a problem that the data amount of images required for generation of a virtual viewpoint image becomes very large.

SUMMARY OF THE INVENTION

The present invention provides a technique capable of obtaining a virtual viewpoint image while reducing the data amount.

The image processing apparatus according to one aspect of the present invention is an image processing apparatus including: a first generation unit configured to generate three-dimensional shape data indicating a shape of an object based on at least one of a plurality of images captured from different directions by a plurality of image capturing devices; a second generation unit configured to generate color information indicating a color of each element of the three-dimensional shape data based on the three-dimensional shape data generated by the first generation unit and the plurality of images; and a write unit configured to write the three-dimensional shape data and the color information to a storage unit in association with each other as material data for generating a virtual viewpoint image corresponding to virtual viewpoint information indicating a virtual viewpoint.

Further features of the present invention will become apparent from the following description of exemplary embodiments with reference to the attached drawings.

BRIEF DESCRIPTION OF THE DRAWINGS

FIG. 3 is a diagram showing a data example of an object three-dimensional model;

FIG. 5 is a diagram showing a data example of color information on an object three-dimensional model;

FIG. 16 is a diagram showing a data example of color correction information on an object three-dimensional model;

DESCRIPTION OF THE EMBODIMENTS

In the following, embodiments of the present invention are explained with reference to the drawings. Note that components described in the embodiments are merely exemplary and not intended to limit the scope of the present invention to those. Further, all combinations of components explained in the embodiments are not necessarily indispensable to the method to solve the problem and it is possible to perform various kinds of modification and change within the scope of the gist of the present invention described in the scope of the claims.

In the present specification, the alphabet at the end of symbol is used to identify each individual configuration in the configurations of the same type. In a case where description is given by omitting the alphabet at the end, it is assumed that description is given by not distinguishing in particular each individual configuration from one another.

First Embodiment

System Configuration

Figure 1:
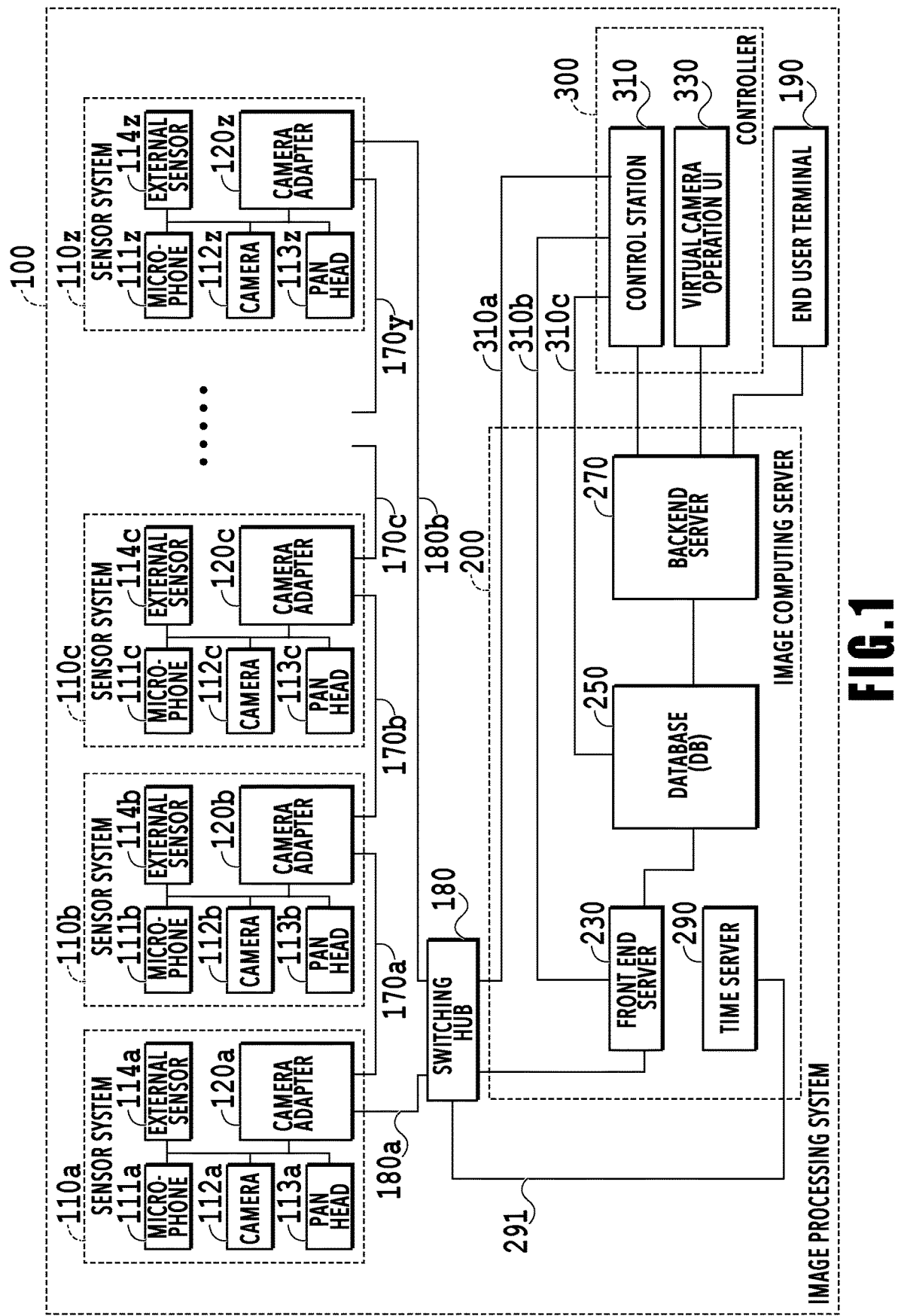
FIG. 1 is a diagram showing a configuration example of an image processing system.

FIG. 1 is a diagram showing a configuration example of an image processing system according to the present embodiment. An image processing system 100 of the present embodiment has an aspect in which a plurality of cameras and microphones is installed in a facility, for example, such as a sports arena (stadium) and a concert hall, and image capturing is performed and sounds are collected. The image processing system 100 has sensor systems 110a to 110z, an image computing server 200, a controller 300, a switching hub 180, and an end user terminal 190.

The controller 300 has a control station 310 and a virtual camera operation UI (User Interface) 330. It is possible for the control station 310 to perform control for each block (server, device, and the like) configuring the image processing system 100 through networks 310a, 310b, 310c, 180a, and 180b, and daisy chains 170a to 170y. For example, the control station 310 performs management of the operation state of each block, parameter setting control, and the like. The above-described network may be GbE (gigabit Ethernet) or 10 GbE in conformity with the IEEE standard, which is Ethernet (registered trademark), or may be configured by combining interconnect Infiniband, industrial Ethernet, and the like. Further, the network is not limited to those and may be another type of network.

The sensor systems 110a to 110z transmit 26 sets of images and voices from the sensor system 110z to the image computing server 200. In the image processing system 100 of the present embodiment, the sensor systems 110a to 110z are connected in a daisy chain. Because of this, the image and voice obtained in each sensor system are transmitted sequentially to the sensor system on the downstream side which is chain-connected. Then, from the most downstream sensor system 110z, the images and voices corresponding to 26 sets are transmitted to the image computing server 200 via the network 108b and the switching hub 180. By adopting the configuration of the daisy chain connection, it is possible to reduce the number of connection cables and the wiring work load. The network configuration may be a star network configuration in which each sensor system 110 is connected to the switching hub 180 and transmission and reception of data between the sensor systems 110 are performed via the switching hub 180. In FIG. 1, although explanation is given by taking 26 sets as the number of sensor systems as an example, this is merely an example and the number of sensor systems is not limited to this.

In the present embodiment, unless stated particularly, explanation is given on the assumption that the wording "image" includes the concept of a moving image and a still image. That is, it is possible for the image processing system 100 of the present embodiment to process both a still image and a moving image. Further, in the present embodiment, although an example is explained mainly in which in the virtual viewpoint contents provided by the image processing system 100, a virtual viewpoint image and a virtual listening point sound are included, the virtual viewpoint contents are not limited to those. For example, it may also be possible for the virtual viewpoint contents not to include a voice. Further, for example, the voice included in the virtual viewpoint contents may be a voice collected by a microphone closest to the position of the virtual viewpoint or may be created from voices collected by a plurality of microphones. Furthermore, it is assumed that basically both an image and a voice are processed although description on the voice is partially omitted in the present embodiment for simplification of explanation.

The sensor system 110 has a microphone 111, a camera 112, a pan head 113, an external sensor 114, and a camera adapter 120. Each sensor system 110 has the one camera 112. As described above, the image processing system 100 has a plurality of the cameras 112 for capturing an object from a plurality of directions. The camera 112 and the camera adapter 120 may be configured into one unit. Further, it may also be possible for a front end server 230 to have at least a part of the functions of the camera adapter 120. In a case where, for example, a gyro sensor is made use of as the external sensor 114, it is possible to acquire information indicating a vibration.

Here, the operation of the camera adapter 120 is explained. The camera adapter 120 has a function to separate a captured image captured by the camera 112 into a foreground image and a background image. For example, the camera adapter 120 separates a captured image (hereinafter, also described as image sometimes) captured by the camera 112 into a foreground image obtained by extracting an object that performs an action (moving object), such as a player, and a background image of an object whose stationary state or state close to the stationary state continues, such as a lawn. Here, it is assumed that a person, such as a player, is taken as an object (foreground). The object (foreground) may be a ball. Then, the camera adapter 120 outputs the foreground image and the background image separated from each other to another camera adapter 120 on the downstream side, which is chain-connected. The separation method into a foreground image and a background image is not limited to the background differential method and it is possible to apply a publicly known method. The still object refers to an object whose still state or almost still state continues.

The foreground image including an object and the background image, both being generated by each of the camera adapters 120a to 120z, are transmitted sequentially to the camera adapter on the downstream side and output to the image computing server 200 from the most downstream camera adapter 120z. Due to this, in the image computing server 200, the foreground image and the background image, both being generated from the captured image of each camera 112, are concentrated.

Next, the configuration and the operation of the image computing server 200 are explained. The image computing server 200 of the present embodiment performs processing for the data acquired from the sensor system 110z. The image computing server 200 has the front end server 230, a database 250 (hereinafter, also described as DB sometimes), a backend server 270, and a time server 290.

The time server 290 has a function to distribute a time and a synchronization signal and distributes a time and a synchronization signal to the sensor systems 110a to 110z via the switching hub 180. The camera adapters 120a to 120z having received a time and a synchronization signal externally synchronize the cameras 112a to 112z based on the time and the synchronization signal and perform synchronization of images (frames). That is, the time server 290 synchronizes the image capturing timings of a plurality of the cameras 112. Due to this, it is possible for the image processing system 100 to generate a virtual viewpoint image based on a plurality of images captured at the same timing, and therefore, it is possible to suppress a reduction in quality of a virtual viewpoint image due to a shift in the image capturing timing. In the present embodiment, although it is assumed that the time server 290 manages the time synchronization of the plurality of the cameras 112, this is not limited and it may also be possible for each camera 112 or each camera adapter 120 to perform processing for time synchronization independently.

The front end server 230 acquires the foreground image and the background image, both being generated from the captured image of each camera 112, from the sensor system 110*z*. Then, the front end server 230 generates a three-dimensional model (three-dimensional shape data) representing a three-dimensional shape of an object by using the acquired foreground image. As a method of generating a three-dimensional model, mention is made of, for example, a method called Visual Hull. In the Visual Hull method, the three-dimensional space in which a three-dimensional model exists is divided into small cubes. Then, the cube is projected onto the silhouette of the foreground image of each camera and in a case where the cube is not included within the silhouette area for at least one camera, the cube is deleted and this processing is repeated, and the cubes that are left are generated as a three-dimensional model.

The method of generating a three-dimensional model is not limited to the Visual Hull method and another method may be used. In the present embodiment, it is assumed that a three-dimensional model is represented by a point cloud having position information on x, y, and z in the three-dimensional space in the world coordinate space uniquely indicating the image capturing-target space. The three-dimensional model is not limited to one represented by a point cloud and may be represented by another data format and for example, may be represented by a polygon mesh model configured by simple convex polygon surfaces, such as a triangle and a rectangle, or may be represented by voxels or the like. The front end server 230 stores the background image generated from the captured image of each camera 112 and the generated object three-dimensional model described above in the DB 250. It is assumed that information indicating the contour of the shape of the three-dimensional model is also stored together. For simplification of explanation, explanation is given by assuming that the contour information is information representing the contour by the cuboid surrounding the outside of the shape of the three-dimensional model. The contour information is not limited to this shape and any shape may be accepted as long as it surrounds the outside of the shape of a three-dimensional model.

That is, the front end server 230 has a function as a data generation device that generates material data for generating a virtual viewpoint image, to be described later in detail, and stores the generated material data in the DB 250. Further, the front end server 230 also has a function to generate color information on each element of an object three-dimensional model from an image captured by a camera, to be described later in detail, and to store the generated color information in the DB 250.

The backend server 270 receives a specification of a virtual viewpoint from the virtual camera operation UI 330, reads corresponding image data and voice data from the DB 250 based on the received viewpoint, and generates a virtual viewpoint image by performing rendering processing. That is, the backend server 270 has a function as a virtual viewpoint image generation apparatus that generates a virtual viewpoint image based on a captured image (multiple viewpoint image) captured by a plurality of the cameras 112 and viewpoint information. Then, the backend server 270 provides the generated virtual viewpoint image to the end user terminal 190. The virtual viewpoint image in the present embodiment is contents including a virtual viewpoint image obtained in a case where an object is captured from a virtual viewpoint. In other words, it can also be said that the virtual viewpoint image is an image in a case where it is assumed that the image is captured at a position and in a direction at a specified viewpoint. The virtual viewpoint may be specified by a user or may be automatically specified based on results or the like of an image analysis. That is, in the virtual viewpoint image, an arbitrary viewpoint image (virtual viewpoint image) corresponding to a viewpoint specified arbitrarily by a user.

The configuration of the image computing server 200 is not limited to this. For example, at least two of the front end server 230, the DB 250, and the backend server 270 may be configured into one unit. Further, at least one of the front end server 230, the DB 250, and the backend server 270 may be included in plurality. Furthermore, a device other than the above-described devices may be included at an arbitrary position within the image computing server 200. Still furthermore, it may also be possible for the end user terminal 190 and the virtual camera operation UI 330 to have at least a part of the functions of the image computing server 200.

The virtual viewpoint image generated by the backend server 270 is transmitted from the backend server 270 to the end user terminal 190. Because of this, it is possible for a user who operates the end user terminal 190 to browse an image and to listen to a voice in accordance with a specified viewpoint. As a supplement, although the example is explained mainly in which voice data (audio data) is included in the virtual viewpoint contents in the present embodiment, the voice data does not necessarily required to be included. Further, it may also be possible for the backend server 270 to transmit a virtual viewpoint image to the end user terminal 190 by using the MPEG-DASH protocol after compressing and encoding the virtual viewpoint image by the standard technique represented by H.264 and HEVC. Furthermore, it may also be possible to transmit a virtual viewpoint image in the uncompressed state to the end user terminal 190. In this case, the former in which compression and encoding are performed supposes a smartphone and a tablet as the end user terminal 190 and the latter supposes a display capable of displaying an uncompressed image. That is, it is possible to switch image formats in accordance with the type of the end user terminal 190. In addition, the image transmission protocol is not limited to MPEG-DASH and it is also possible to use HLS (HTTP Live Streaming) or another transmission method.

The control station 310 sets in advance a stadium three-dimensional model representing a stadium for which a virtual viewpoint image is to be generated by a three-dimensional model and stores in the DB 250. Further, the control station 310 performs calibration at the time of installation of the camera. Specifically, a marker is installed on the image capturing-target field and by the captured image of each camera 112, the position and orientation in the world coordinates and the focal length of each camera are derived. Information on the derived position, orientation, and focal length of each camera is stored in the DB 250 as information on the camera (camera parameter). The stadium three-dimensional model and the information on each camera, both stored in the DB 250, are read by the backend server 270 and used at the time of generating a virtual viewpoint image in the backend server 270. Further, the information on each camera is read by the front end server 230 and used at the time of generating an object three-dimensional model in the front end server 230.

The image processing system 100 in the present embodiment is not limited to the physical configuration explained above and may be configured logically.

Next, the detailed configuration and operation of the front end server 230 are explained. The front end server 230 has a function as a data generation apparatus that generates material data for generating a virtual viewpoint image of a background image, an object three-dimensional model, and the like and stores in the DB 250, and details thereof are explained.

First, a relationship between the world coordinate space representing an image capturing-target space of a camera, a camera, and an object three-dimensional model that is an image capturing target of the camera is explained with reference to FIG. 2 and FIG. 3.

Figure 2:
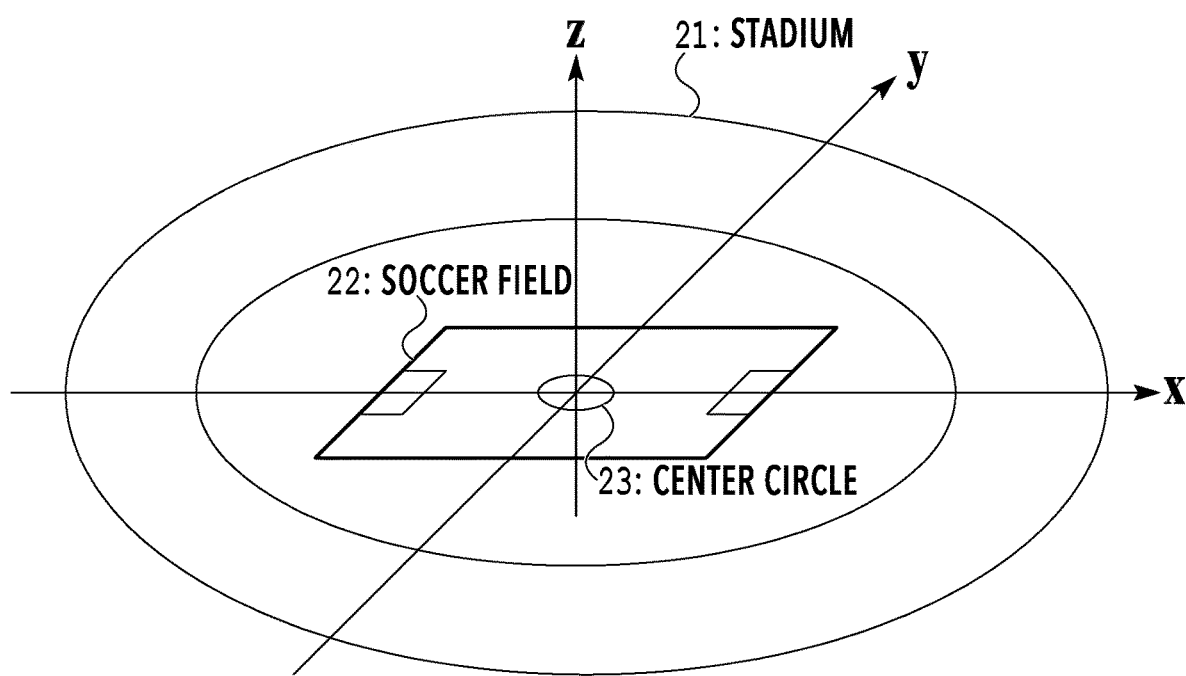
FIG. 2 is a diagram showing an example of a world coordinate space.

FIG. 2 is a diagram showing an example of the world coordinate space. The world coordinate space is a space representing, for example, an image capturing target in a three-dimensional space. FIG. 3 is a diagram showing a data example of an object three-dimensional model. The object three-dimensional model referred to here is data representing a three-dimensional shape of the object. In FIG. 2, it is assumed that the world coordinate space is set for a soccer field 22 at the center in a stadium 21 as a target. In the present embodiment, it is assumed that the world coordinate space is a space in which the center of a center circle 23 is taken to be the origin, the direction along the long side direction of the soccer field 22 (horizontal direction in FIG. 2) is taken to be an x-axis, the direction along the short side direction is taken to be a y-axis, and the vertical direction (direction of height) is taken to be a z-axis. In the present embodiment, although the soccer field is taken to be a target, the target may be any object and the target is not limited in particular.

Although no cameras are shown schematically in FIG. 2, it is assumed that regarding each camera, camera parameters representing the coordinate position of the camera in the world coordinate space, the rotation angles (horizontally, vertically) of the camera, the focal length, and the image center are set.

As shown in FIG. 3, an object three-dimensional model is represented by an aggregate of points (hereinafter, point cloud) having x, y, and z coordinate values in the world coordinate space in which the model exists. Here, although it is assumed that the coordinate is represented by a numerical value in units of mm, the coordinate is not limited to one represented by a numerical value in this unit.

Configuration of Front End Server 230

Figure 4:
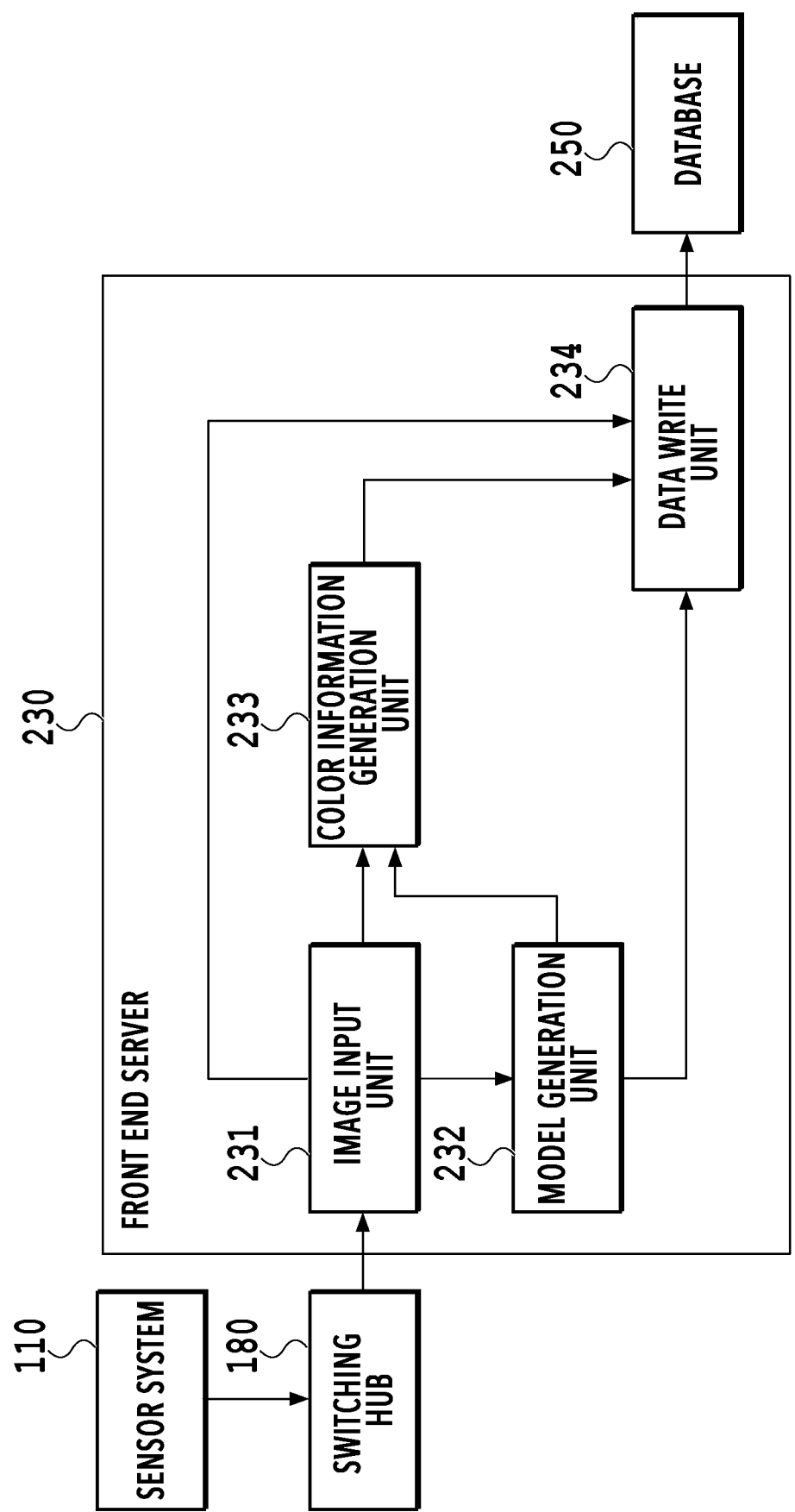
FIG. 4 is a block diagram showing a function configuration example of a front end server.

FIG. 4 is a block diagram showing a function configuration example of the front end server 230.

An image input unit 231 receives a foreground image and a background image, both being generated from a captured image of each camera, from the sensor system 110 via the switching hub 180. The image input unit 231 outputs the received background image to a data write unit 234 and on the other hand, outputs the received foreground image to a model generation unit 232 and a color information generation unit 233, respectively.

The model generation unit 232 generates an object three-dimensional model based on the foreground image input from the image input unit 231 and the camera parameters set in advance. The model generation unit 232 outputs the generated object three-dimensional model to the color information generation unit 233 and the data write unit 234, respectively.

The color information generation unit 233 determines a color for each point (point coordinate) of the object three-dimensional model based on the object three-dimensional model and the foreground image and generates color information on the object three-dimensional model. The color information on the object three-dimensional model is information in which each point of the object three-dimensional model and the color information are associated with each other and for example, as shown in FIG. 5, information in which each point coordinate ID of the object three-dimensional model and the RGB value are associated with each other. The point coordinate ID is an ID that is determined independently for each point of the object three-dimensional model in one frame. For example, to the points of the object three-dimensional model existing within one frame, the ID is given in an ascending order from 0. Further, a camera ID indicated by each point coordinate ID indicates the ID of a camera having captured an image used for generating color information on that point. The ID of each camera is a number given independently in the system. Here, although the color information on the object three-dimensional model is taken to be the RGB value, any format may be accepted as long as it is possible to represent color and luminance and for example, the format of YCbCr representing a luminance and a color difference may be accepted.

Figure 6:
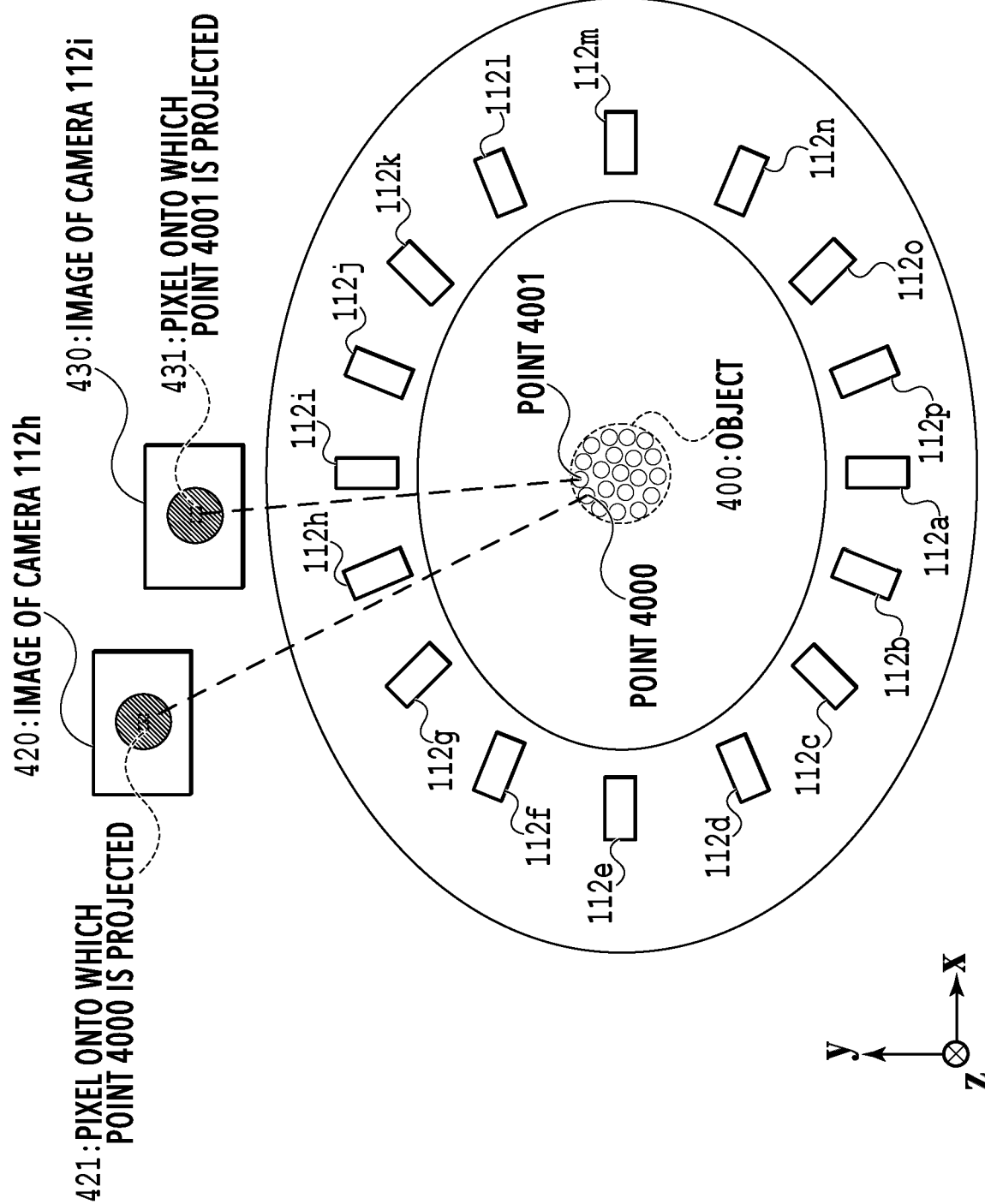
FIG. 6 is a diagram showing a correspondence example between points of the object three-dimensional model, cameras, and color information.

The correspondence between a point of the object three-dimensional model, a camera, and color information is explained with reference to FIG. 6. FIG. 6 is a diagram in a case a stadium in which the cameras 112a to 112p and spherical object 400 are arranged is viewed from directly above and showing a correspondence example between the point of the object three-dimensional model, the camera, and the color information. The cameras 112a to 112p are arranged around the object 400 so as to face the object 400 side and have different viewpoints, and the camera ID is given to each of the cameras 112a to 112p.

It is assumed that attention is focused on a point 4000 of the points forming the object 400 and the image used for generation of color information on the point 4000 is the image of the camera 112h. In this case, the color information is generated by the RGB value of a pixel 421 corresponding to the point 4000 from an image 420 of the camera 112h. That is, the point 4000 is projected onto the image 420 of the camera 112h and the corresponding pixel 421 is specified, and the color information is generated by the RGB value of the pixel 421. Similarly, in a case where it is assumed that the image used for generation of the color information on a point 4001 is the image of the camera 112i, the color information is generated by the RGB value of a pixel 431 corresponding to the point 4001 from an image 430 of the camera 112i.

Details of the generation method of color information on an object three-dimensional model, such as a camera selection method and a color information generation method, will be described later.

Returning to FIG. 4. The data write unit 234 writes the background image, the object three-dimensional model, and the color information on the object three-dimensional model, which are input from each of the units, to the DB 250 in units of cameras and in units of frames.

Data Acquisition Procedure Example

Next, an acquisition procedure example of material data for generating a virtual viewpoint image, which is performed in the front end server 230, is explained with reference to FIG. 7.

Figure 7:
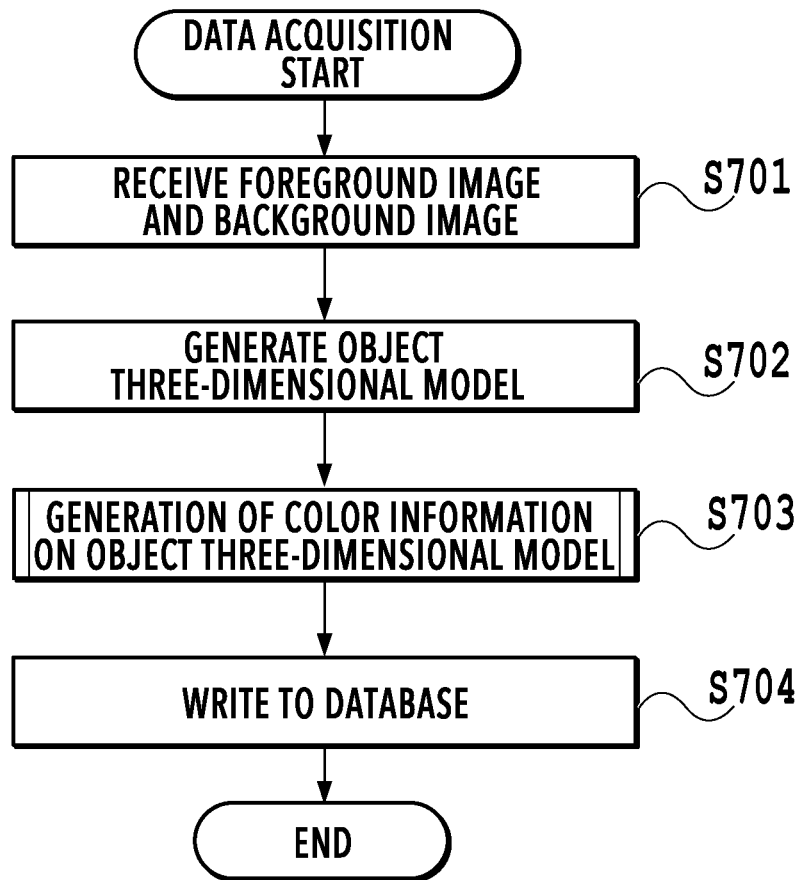
FIG. 7 is a flowchart showing a data acquisition procedure example.

FIG. 7 is a flowchart showing a data acquisition procedure example. Specifically, FIG. 7 is a flowchart showing a procedure from the front end server 230 receiving data from the sensor system 110 until various kinds of data are written to the DB 250. In the following, in accordance with the flowchart, the flow of the processing is explained. In the following explanation of the flow, symbol "S" represents a step. It is assumed that the front end server 230 acquires in advance camera parameters from, for example, the DB 250 or the like.

At S701, the image input unit 231 receives a foreground image and a background image from the sensor system 110 via the switching hub 180. The image input unit 231 outputs the received background image to the data write unit 234 and outputs the received foreground image to the model generation unit 232 and the color information generation unit 233.

At S702, the model generation unit 232 generates an object three-dimensional model by using the Visual Hull method or the like based on the foreground image input from the image input unit 231 and the camera parameters set in advance. Then, the model generation unit 232 outputs the generated object three-dimensional model to the color information generation unit 233 and the data write unit 234.

At S703, the color information generation unit 233 generates color information on the object three-dimensional model based on the object three-dimensional model and the foreground image, which are input, and the camera parameters set in advance. Then, the color information generation unit 233 outputs the color information on the object three-dimensional model to the data write unit 234. Details of a color information generation procedure example of the object three-dimensional model will be described later.

At S704, the data write unit 234 writes the object three-dimensional model, the color information on the object three-dimensional model, and the background image, which are input, to the DB 250.

The above is the flow of acquisition of material data for generating a virtual viewpoint image in the front end server 230.

Details of S703

Next, details of S703, that is, a color information generation procedure example performed in the color information generation unit 233 is explained with reference to FIG. 8.

Figure 8:
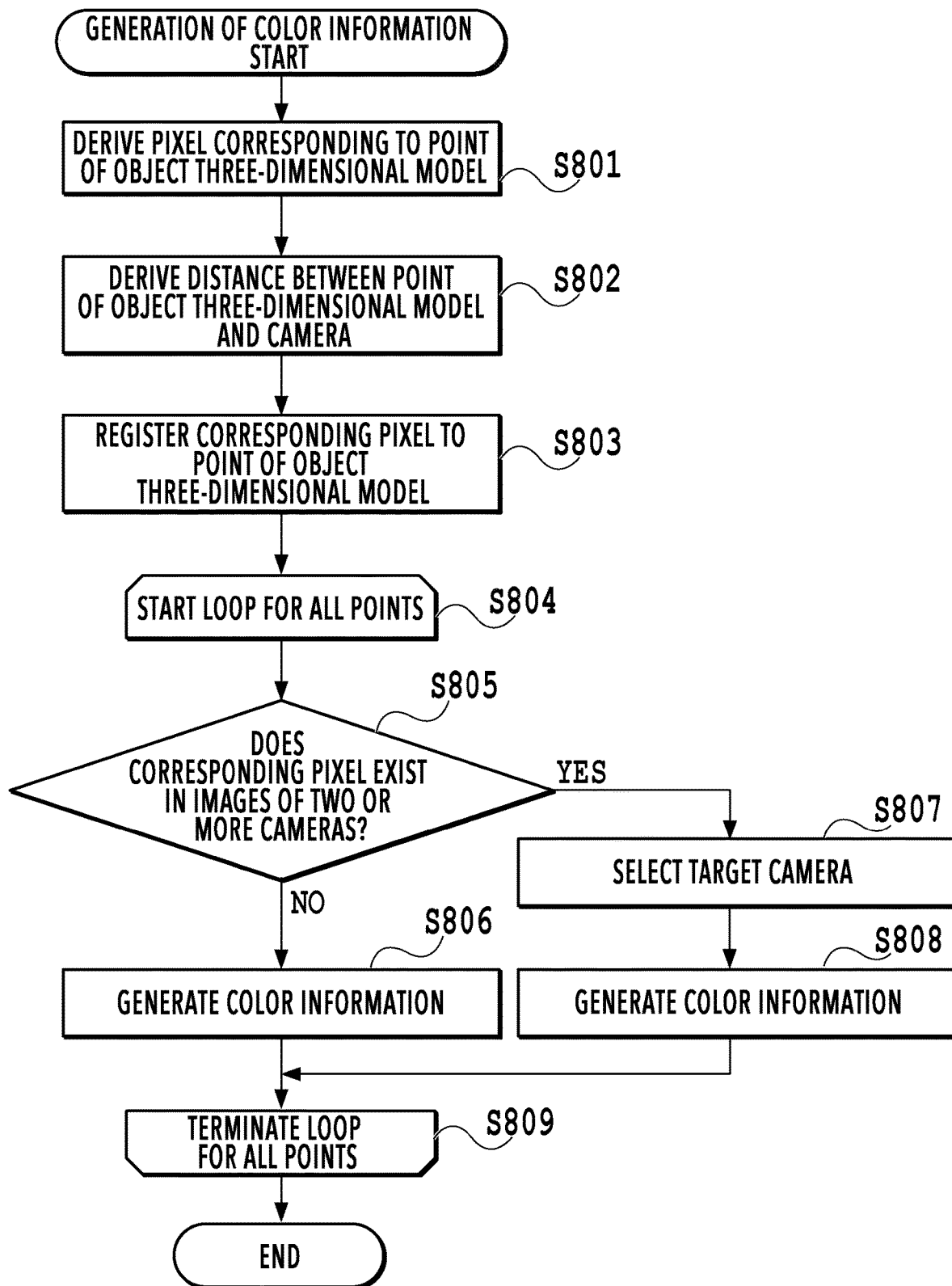
FIG. 8 is a flowchart showing a color information generation procedure example.

FIG. 8 is a flowchart showing a color information generation procedure example. In the following, in accordance with the flowchart, the flow of the processing is explained.

At S801, the color information generation unit 233 derives a pixel corresponding to point coordinates in an image captured by a camera by a geometric calculation based on the camera parameters set in advance and the point coordinates of the object three-dimensional model. Specifically, the color information generation unit 233 projects each point of the object three-dimensional model onto the image captured by a camera and derives the coordinates of the pixel corresponding to each of the points. That is, at S801, from the image of a camera, the pixel corresponding to the point coordinates of the object three-dimensional model is extracted.

At S802, the color information generation unit 233 derives a distance between the point of the object three-dimensional model and the camera based on the camera parameters and the point coordinates of the object three-dimensional model.

At S803, the color information generation unit 233 derives the closest point of the object three-dimensional model based on the distance derived at S802 for each pixel of the image of each camera, which is derived at S801. Then, the color information generation unit 233 registers the closest point as a corresponding pixel for generating color information on the object three-dimensional model of the pixel. That is, for all the points of the object three-dimensional model, a pixel that may become color information on the object three-dimensional model is extracted from the image of each camera and registered as a corresponding pixel.

After this, at S804 to S809, for all the points of the object three-dimensional model, the processing to generate color information for each point is performed. That is, at S804, loop processing is started for all the points of the object three-dimensional model.

At S805, for the corresponding pixel registered at S803, whether the number of cameras having captured the image in which the corresponding pixel exists is two or more is determined. That is, for the corresponding pixel registered at S803, whether the corresponding pixel exists in the images of the two or more cameras is determined.

In a case where the corresponding pixel registered for the point of the object three-dimensional model exists in the image of the one camera (S805: NO), color information is generated from the pixel value of the corresponding pixel existing in the image of the camera (S806). In a case where the number of corresponding pixels existing in the image of the camera is only one, the pixel value of the corresponding pixel is generated as color information and in a case where the number of corresponding pixels existing in the image of the camera is two or more, the average value of the pixel values of a plurality of corresponding pixels is generated as color information.

On the other hand, in a case where the corresponding pixel registered for the point of the object three-dimensional model exists in the images of the two or more cameras (a plurality of the cameras) (S805: YES), the one target camera for generating color information is selected (S807). The camera selection method will be described later. Then, based on the pixel value of the corresponding pixel existing in the image of the selected camera, color information is generated (S808). After this, the processing advances to S809 and in a case where the processing for all the points is completed, the loop processing from S804 to S809 is terminated and the color information generation processing is completed as a result. The color information generated at S806 and S808 is stored in association with the point at S704 described above.

Here, the camera selection method and the color information generation method are explained with reference to FIG. 9.

Figure 9:
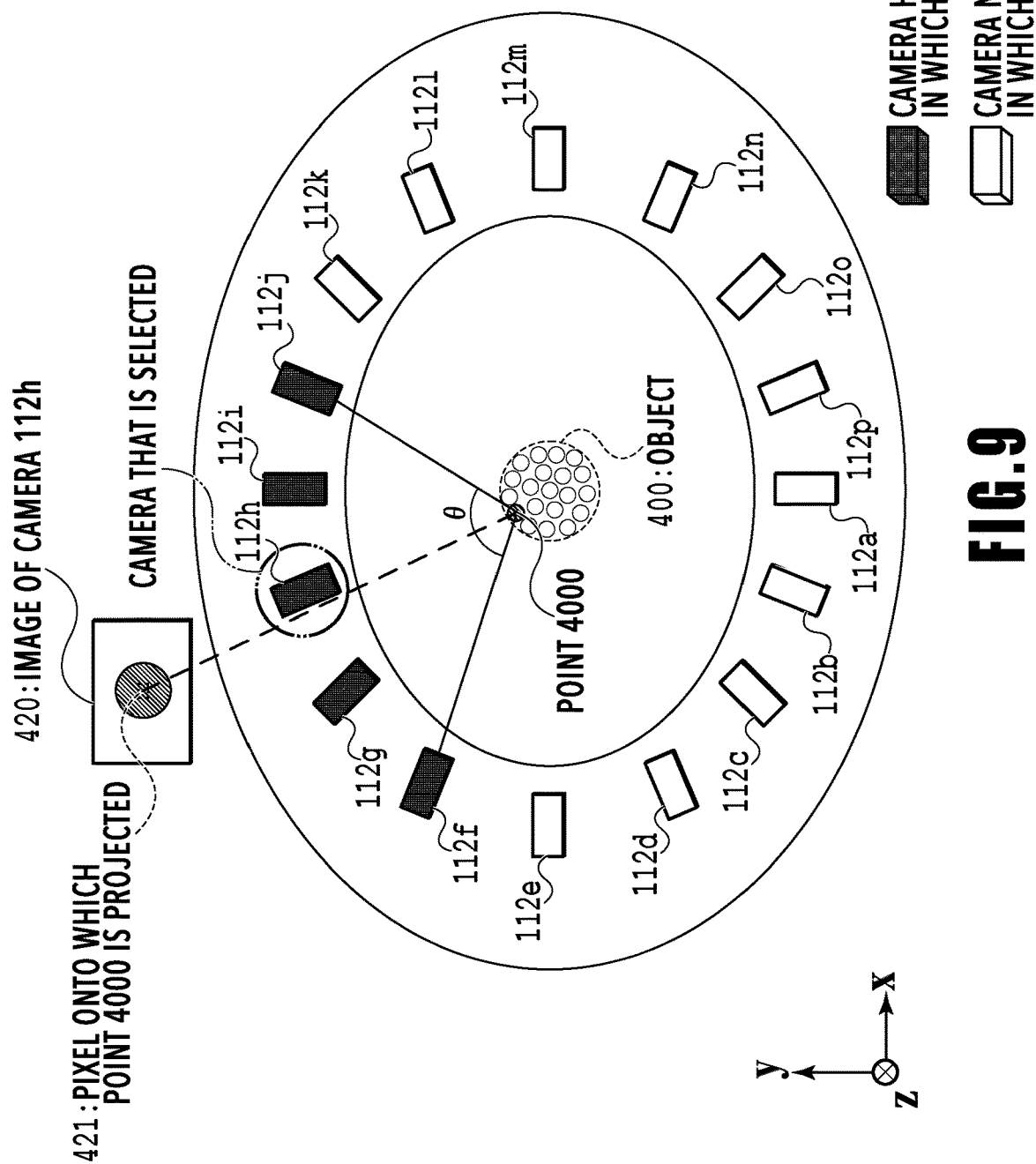
FIG. 9 is a diagram for explaining a camera selection method and a color information generation method.

FIG. 9 is a diagram in a case where a stadium in which the 16 cameras are arranged around the object (object three-dimensional model) is viewed from a bird's eye directly above. A case where color information generation processing is performed for the point 4000 of the points forming the object 400 is explained specifically. It is assumed that the processing at S801 to S803 is performed and for the point 4000 of the object 400, the cameras having captured an image in which the corresponding pixel exists is the five cameras pained in black, that is, the cameras 112f to 112j.

First, of the cameras having captured the image in which the corresponding pixel exists, the two cameras located on the outermost sided are selected. Here, the two cameras located on the outermost sided refer to the cameras located at both ends in a circumferential direction in a case where the direction in which a plurality of cameras is adjacent to one another with the image capturing-target point 4000 as a center is taken to be the circumferential direction. In the example in FIG. 9, the camera 112*f* and the camera 112*j* correspond to the two cameras located on the outermost sides.

Next, a bisector of an angle θ formed by a segment connecting the camera 112*f* and the point 4000 and a segment connecting the camera 112*j* and the point 4000 is set and the camera closest to the position that the bisector passes is selected as the camera used to generate color information. That is, the camera facing the element of the object is selected as the color information generation-target camera. In the example in FIG. 9, the camera 112*h* is selected. In a case where the number of cameras having captured the image in which the corresponding pixel exists is two or more, the camera with the highest priority is selected in accordance with priority determined in advance and here, for example, the priority is high in order from the camera 112*a*, camera 112*b*, . . . , and the camera 112*p*.

In a case where only one corresponding pixel exists in the image of the camera, the pixel value of the corresponding pixel is generated as color information and in a case of a plurality of corresponding pixels exist in the image of the camera, the average value of the pixel values of the plurality corresponding pixels is generated as color information (S808). Here, the RGB value of the corresponding pixel 421 in a case where the point 4000 is projected onto the image 420 of the camera 112*h* is generated as color information.

The value of the pixel selected in this manner is stored in association with the point.

Here, although the above-described color information generation method is explained as an example, another method may be used and the method is not limited to the above-described color information generation method. For example, it may also be possible to select a plurality of cameras and to take an average value as color information, or it may also be possible to take an average value of pixel values of pixels except for pixels whose values are largely different in a case where there is a plurality of corresponding pixels.

As above, the method of storing the object three-dimensional model and the color information thereon in the DB 250 is described.

In the following, a method of generating a virtual viewpoint image by reading an object three-dimensional model and color information thereon, which are stored, is described. That is, detailed configuration and operation of the backend server 270 are explained.

Configuration of Backend Server 270

Figure 10:
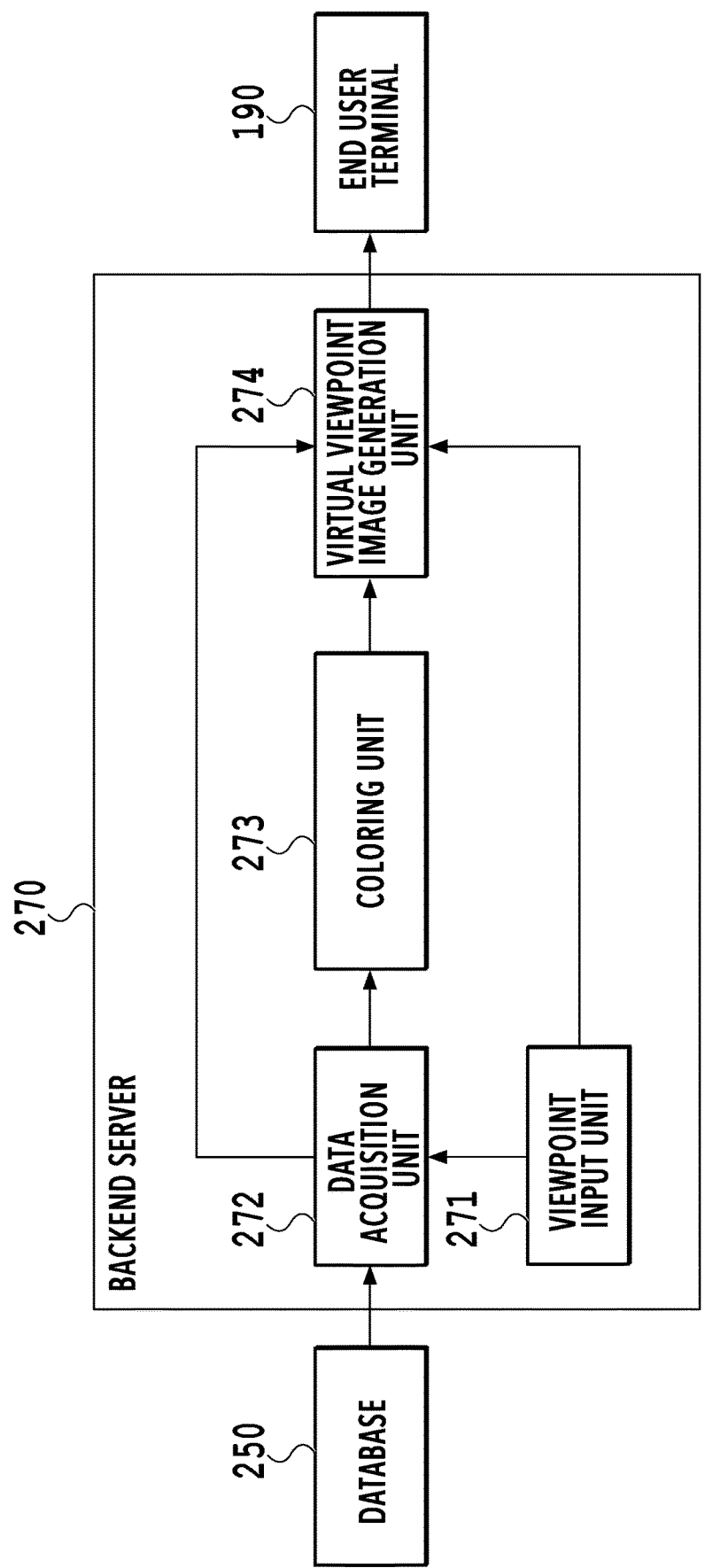
FIG. 10 is a block diagram showing a function configuration example of a backend server.

FIG. 10 is a block diagram showing a function configuration example of the backend server 270.

A viewpoint input unit 271 receives an input of virtual viewpoint information by a user, not shown schematically, via the end user terminal 190, the virtual camera operation UI 330, or the like and outputs the virtual viewpoint information to a data acquisition unit 272 and a virtual viewpoint image generation unit 274. The virtual viewpoint information is information including the time at which a virtual viewpoint image is captured by a virtual camera that does not exist actually and which is supposed to be arranged at a virtual viewpoint, the position of the virtual viewpoint (virtual camera), the orientation of the virtual camera, the angle of view of the virtual camera, the focal length, and the like.

The data acquisition unit 272 acquires an object three-dimensional model and color information thereon relating to an object that is estimated to be viewed from the virtual camera at the virtual viewpoint, which does not exist actually, from the DB 250 based on the input virtual viewpoint information. That is, the data acquisition unit 272 acquires an object three-dimensional model and color information thereon relating to an object estimated to exist within the angle of view of the virtual camera arranged at the virtual viewpoint. The data acquisition unit 272 outputs the acquired data, that is, the object three-dimensional model and the color information thereon to a coloring unit 273. Further, the data acquisition unit 272 acquires a background image from the DB 250 and outputs the acquired background image to the virtual viewpoint image generation unit 274.

The coloring unit 273 gives a color based on the color information on the object three-dimensional model corresponding to a point of the object three-dimensional model to the point and generates a colored object three-dimensional model. The coloring unit 273 outputs the generated colored object three-dimensional model to the virtual viewpoint image generation unit 274.

The virtual viewpoint image generation unit 274 generates a foreground image and a background image, which are viewed from the virtual camera at the virtual viewpoint, based on the virtual viewpoint information, the colored object three-dimensional model, and the background image, which are input, and generates a virtual viewpoint image by combining them. The virtual viewpoint image generation unit 274 transmits the generated virtual viewpoint image to the end user terminal 190.

Virtual Viewpoint Image Generation Procedure Example

Next, a virtual viewpoint image generation procedure example performed in the backend server 270 is explained with reference to FIG. 11.

Figure 11:
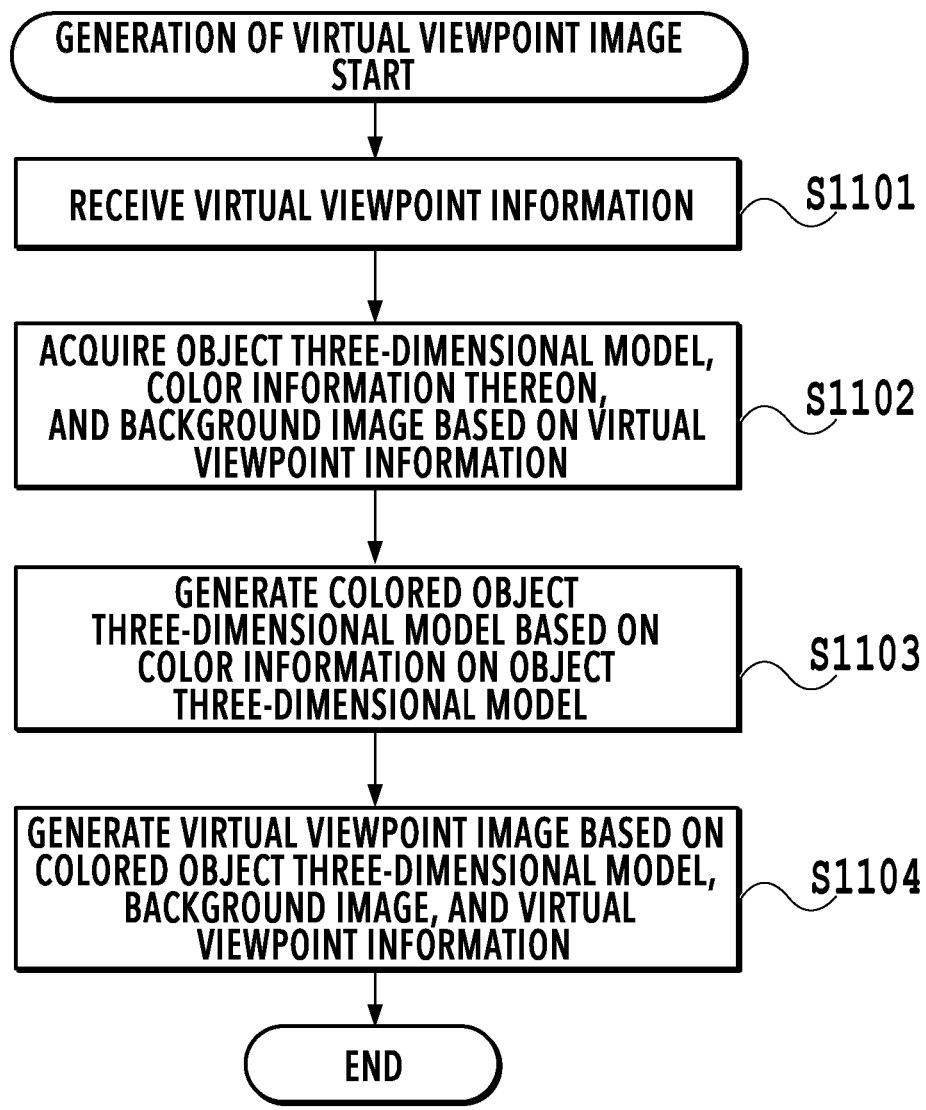
FIG. 11 is a flowchart showing a virtual viewpoint image generation procedure example.

FIG. 11 is a flowchart showing a virtual viewpoint image generation procedure example. In the following, in accordance with the flowchart, the flow of the processing is explained.

At S1101, the viewpoint input unit 271 receives an input of virtual viewpoint information by a user, not shown schematically, via the end user terminal 190 or the like. Then, the viewpoint input unit 271 outputs the received virtual viewpoint information to the data acquisition unit 272 and the virtual viewpoint image generation unit 274.

At S1102, the data acquisition unit 272 acquires an object three-dimensional model and color information thereon from the DB 250 based on the input virtual viewpoint information and outputs them to the coloring unit 273. Further, the data acquisition unit 272 acquires a background image from the DB 250 based on the input virtual viewpoint information and outputs the background image to the virtual viewpoint image generation unit 274. Specifically, the data acquisition unit 272 acquires, based on the time specified by the virtual viewpoint information, an object three-dimensional model and color information thereon, which are generated from a foreground image corresponding to a captured image at that time, and outputs them. Further, the data acquisition unit 272 acquires a background image corresponding to the captured image at that time based on the time specified by the virtual viewpoint information and outputs the background image.

At S1103, the coloring unit 273 gives a color (pixel value) of a corresponding pixel to each point of the object three-dimensional model based on the object three-dimensional model and the color information, which are input, and generates a colored object three-dimensional model. Further, the coloring unit 273 outputs the colored object three-dimensional model to the virtual viewpoint image generation unit 274.

At S1104, the virtual viewpoint image generation unit 274 generates a virtual viewpoint image based on the virtual viewpoint information, the background image, and the colored object three-dimensional model, which are input from each block. Specifically, the virtual viewpoint image generation unit 274 generates a background image in a case where the background image is captured by the virtual camera supposed to be arranged at the virtual viewpoint based on the background image input from the data acquisition unit 272 and the stadium three-dimensional model set in advance. It is assumed that the stadium three-dimensional model is a mesh model having a coordinate position in the world coordinate space. A colored stadium three-dimensional model is generated by generating a texture image in accordance with each mesh from the background image by three-dimensional coordinate conversion and attaching the texture image based on the camera parameters of each camera and the stadium three-dimensional model which are set in advance. Further, a background image is generated by projecting the stadium three-dimensional model existing on the world coordinate space onto the image coordinates of the camera at the virtual viewpoint based on information on the position, the orientation, and the like of the camera at the virtual viewpoint.

Further, the virtual viewpoint image generation unit 274 generates a foreground image in a case where the foreground image is captured by the virtual camera supposed to be arranged at the position of the virtual viewpoint based on the colored object three-dimensional model input from the coloring unit 273. Specifically, the virtual viewpoint image generation unit 274 generates a foreground image by projecting a point having the color of the colored object three-dimensional model existing on the world coordinate space onto the image coordinates of the camera at the virtual viewpoint based on information on the position, the orientation, and the like of the camera at the virtual viewpoint.

The virtual viewpoint image generation unit 274 combines the generated background image and the generated foreground image and generates a virtual viewpoint image. Then, the virtual viewpoint image generation unit 274 transmits the generated virtual viewpoint image to the end user terminal 190.

Although explanation is given by using the color information generation unit 233 configured to generate color information on the point cloud of the object three-dimensional model, the color information generation unit 233 is not limited to this. For example, in a case where the object three-dimensional model is a mesh model, it is also possible to configure a color information generation unit configured to generate color information having the color corresponding to the pixel of the mesh for each mesh of the object three-dimensional model.

From the above, according to the present embodiment, although the foreground image is not stored in the DB, the color information on each element of the object three-dimensional model is stored in the DB. It is possible to generate a virtual viewpoint image by using the stored color information on the object three-dimensional model. Consequently, it is made possible to obtain a virtual viewpoint image while reducing the data amount.

For example, it is assumed that the number of cameras is 30, the image size is 3,840×2,160, the image format is 8-bit RGB, the number of points of the object three-dimensional model is 1,000,000, and the point coordinates of the model are represented by 32 bits.

With the conventional method, the size of the foreground image is 1,920×1,080×3×8×30=1,492,992,000 (bit)= 186.624 (MB).

According to the present embodiment, color information on the object three-dimensional model is generated in place of the foreground image. The size of the color information on the object three-dimensional model is 1,000,000×3× 32=96,000,000 (bit)=12 (MB).

Consequently, according to the present embodiment, under the conditions described previously, it is possible to reduce the data size to about $1/15$ of the that of the conventional example.

Second Embodiment

An image processing system according to the present embodiment is explained in the following.

In the present embodiment, a method is described in which color correction information on an object three-dimensional model whose color is corrected is generated based on images of a plurality of cameras, in addition to color information on the object three-dimensional model, the generated color correction information is stored in the DB, and the color is corrected in accordance with the virtual viewpoint.

Figure 12:
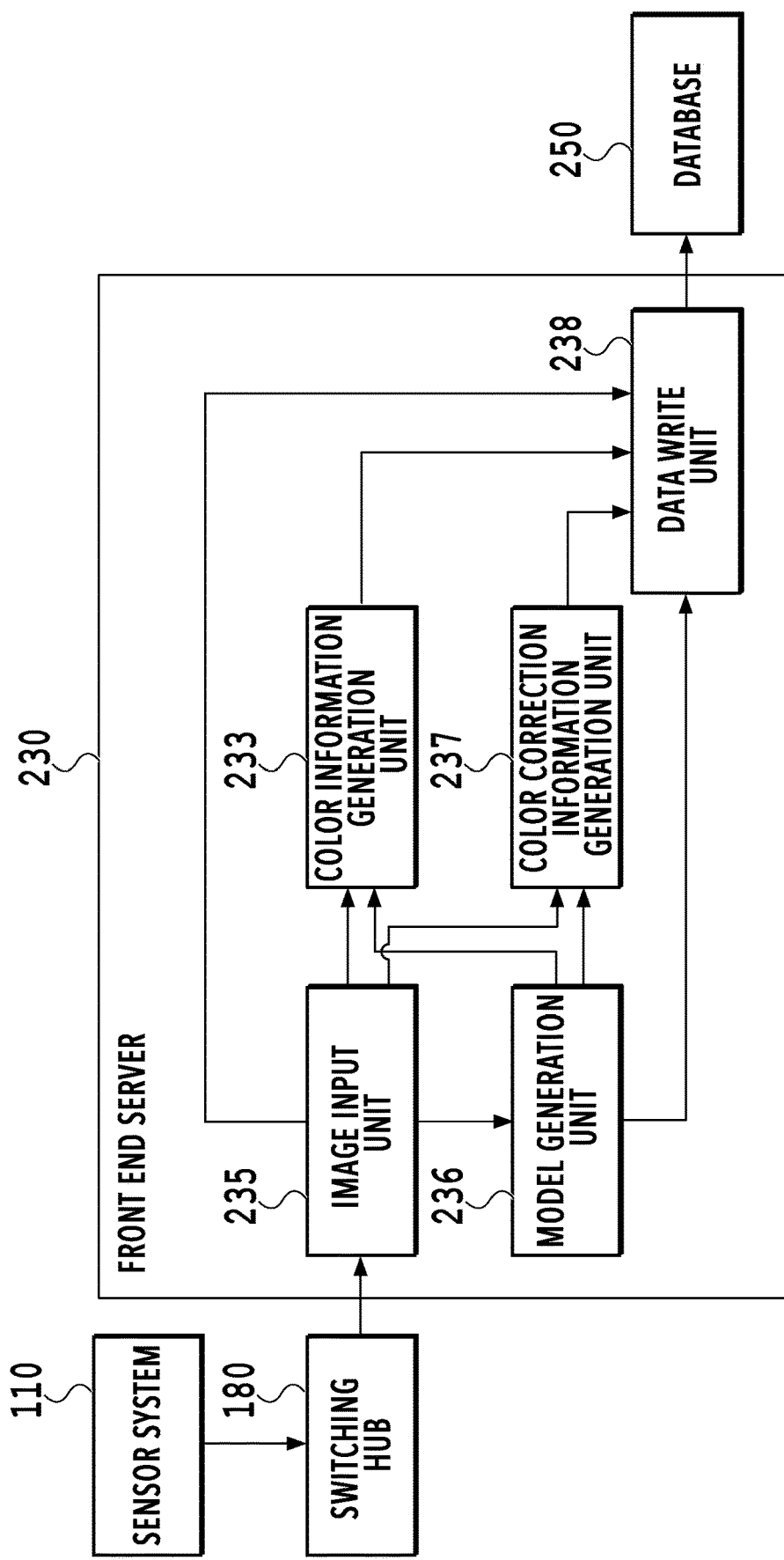
FIG. 12 is a block diagram showing a function configuration example of a front end server.

FIG. 12 is a block diagram showing a function configuration example of the front end server 230 in the present embodiment. In the present embodiment, the same symbol is given to the same block as that of the first embodiment and explanation thereof is omitted appropriately.

An image input unit 235 outputs a foreground image to a color correction information generation unit 237, in addition to the function of the image input unit 231 explained in the first embodiment.

A model generation unit 236 outputs an object three-dimensional model to the color correction information generation unit 237, in addition to the function of the model generation unit 232 explained in the first embodiment.

The color correction information generation unit 237 generates color correction information for each point of the object three-dimensional model based on the foreground image input from the image input unit 235 and the object three-dimensional model input from the model generation unit 236. Details of the generation method of color correction information will be described later. The color correction information generation unit 237 outputs the generated color correction information on the object three-dimensional model to a data write unit 238.

The data write unit 238 writes the color correction information on the object three-dimensional model to the DB 250, in addition to the function of the data write unit 234 explained in the first embodiment.

Data Acquisition Procedure Example

Next, an acquisition procedure example of material data for generating a virtual viewpoint image, which is performed in the front end server 230 of the present embodiment, is explained with reference to FIG. 13.

Figure 13:
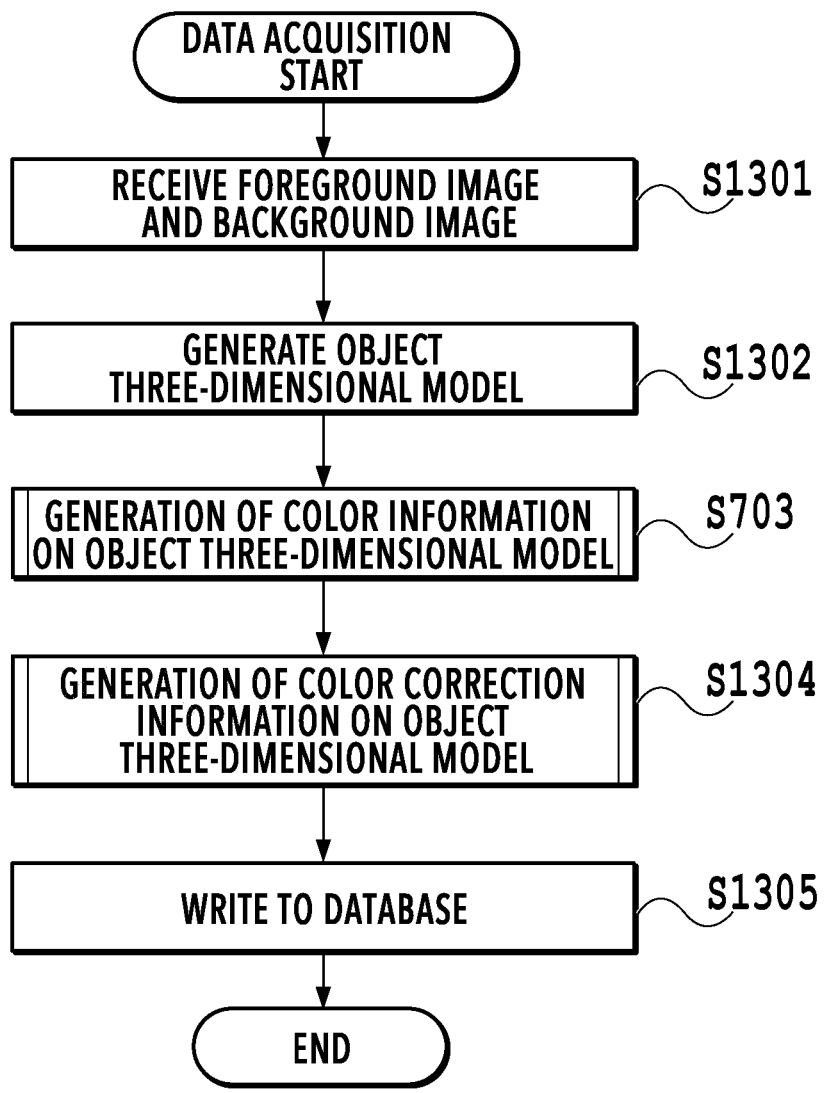
FIG. 13 is a flowchart showing a data acquisition procedure example.

FIG. 13 is a flowchart showing a data acquisition procedure example. Specifically, a flowchart showing a procedure from the front end server 230 receiving data from the sensor system 110 until various kinds of data are written. In the following, in accordance with the flowchart, the flow of the processing is explained. It is assumed that the front end server 230 acquires in advance camera parameters from, for example, the DB 250 or the like.

At S1301 the image input unit 235 receives a foreground image and a background image from the sensor system 110 via the switching hub 180. The image input unit 235 outputs the received background image to the data write unit 238. Further, the image input unit 235 outputs the received foreground image to the model generation unit 236, the color information generation unit 233, and the color correction information generation unit 237.

At S1302, the model generation unit 236 generates an object three-dimensional model by using the Visual Hull method or the like based on the foreground image input from the image input unit 235 and the camera parameters set in advance. Then, the model generation unit 236 outputs the generated object three-dimensional model to the color information generation unit 233, the color correction information generation unit 237, and the data write unit 238.

At S703, the color information generation unit 233 performs the same processing as that of the first embodiment.

At S1304, the color correction information generation unit 237 generates color correction information for each point of the object three-dimensional model based on the object three-dimensional model, the foreground images of a plurality of cameras, and the camera parameters set in advance. The color correction information generation unit 237 outputs the generated color correction information on the object three-dimensional model to the data write unit 238. Details of the generation processing of the color correction information on the object three-dimensional model will be described later.

At S1305, the data write unit 238 writes the object three-dimensional model, the color information thereon, the color correction information on the object three-dimensional model, and the background image, which are input, to the DB 250.

The above is the flow of acquisition of material data for generating a virtual viewpoint image in the front end server 230.

Details of S1304

Next, a color correction information generation procedure example performed in the color correction information generation unit 237, which is details of S1304 is explained with reference to FIG. 14.

Figure 14:
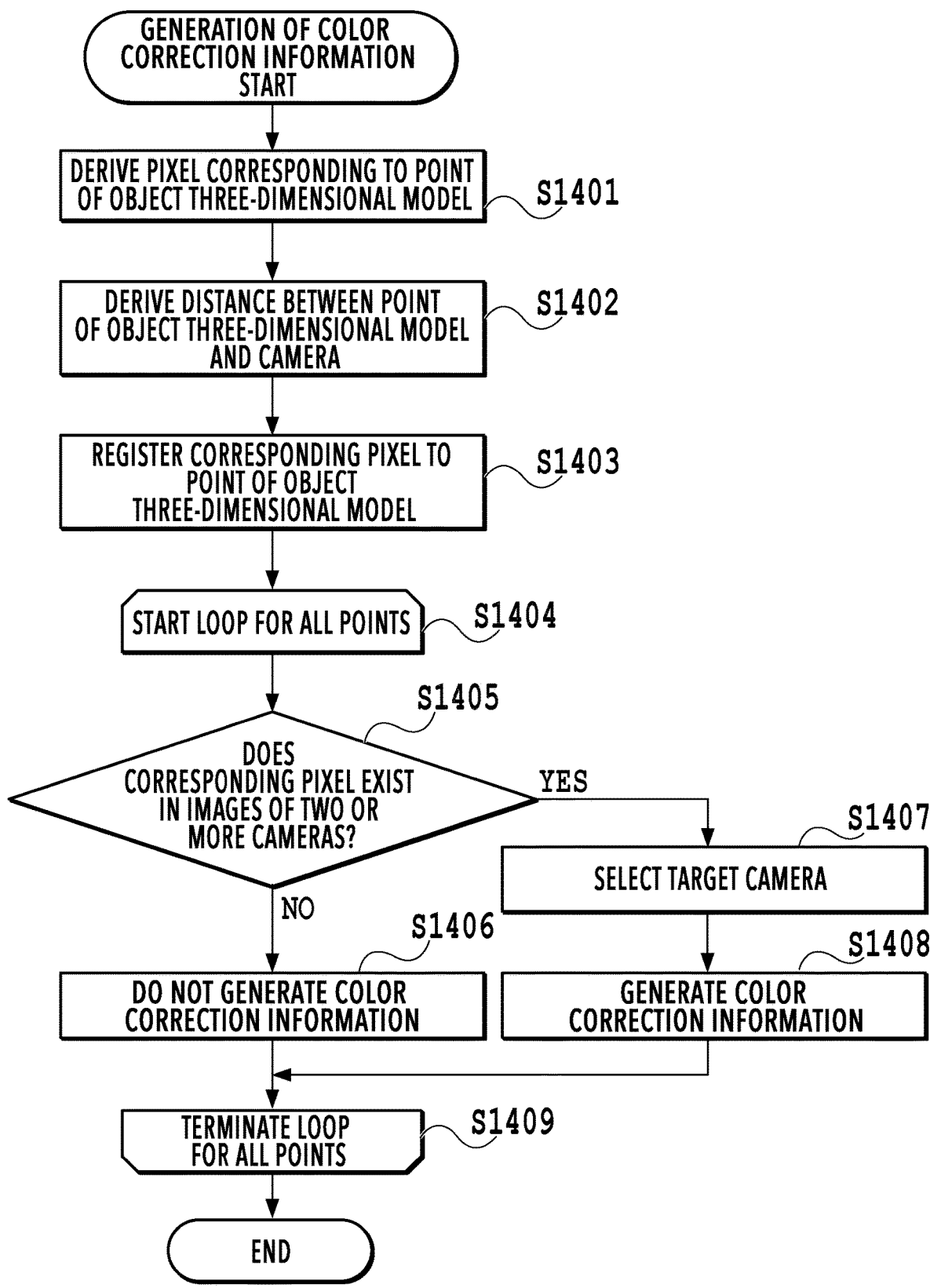
FIG. 14 is a flowchart showing a color correction information generation procedure example.

FIG. 14 is a flowchart showing a color correction information generation procedure example. In the following, in accordance with the flowchart, the flow of the processing is explained. S1401 to S1403 are the same as the processing at S801 to S803 of the color information generation processing in the first embodiment, and therefore, explanation thereof is omitted.

At S1404 to S1409, for all the points of the object three-dimensional model, processing to generate color correction information is performed for each point. That is, at S1404, the loop processing is started for all the points of the object three-dimensional model.

At S1405, for the corresponding pixel registered at S1403, whether the number of cameras having captured the image in which the corresponding pixel exists is two or more is determined. That is, for the corresponding pixel registered at S1403, whether the corresponding pixel exists in the images of the two or more cameras is determined.

In a case where the corresponding pixel registered for the target point for which color correction information on the object three-dimensional model is generated exists in the image of the one camera (NO at S1405), generation of color correction information on the object three-dimensional model is not performed (S1406). Further, it may also be possible to give information indicating that there is no color correction information. The reason is that color information is generated based on the image of the camera in the processing of the color information generation unit 233 and for the point, it is only required to determine color only by the color information and color correction information on the object three-dimensional model is not necessary.

On the other hand, in a case where the corresponding pixel registered for the target point for which color correction information on the object three-dimensional model is generated exists in the images of the two or more cameras (a plurality of cameras) (YES at S1405), the target camera for which color correction information is generated is selected (S1407).

Here, the camera selection method and the color correction information generation method are explained with reference to FIG. 15.

Figure 15:
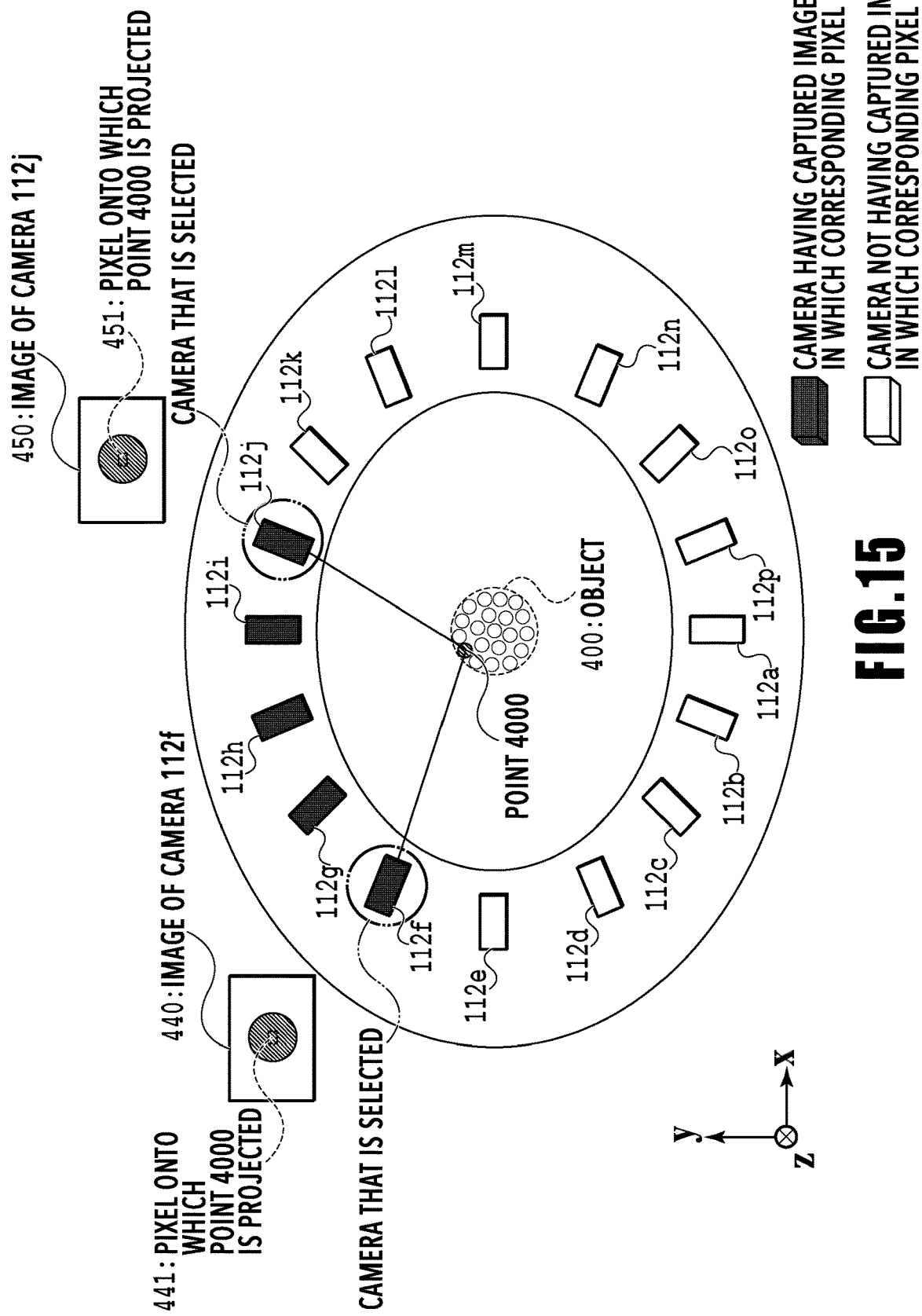
FIG. 15 is a diagram explaining a camera selection method and a color correction information generation method.

FIG. 15 is a diagram in a case where the stadium in which the 16 cameras are arranged around the object (object three-dimensional model) is viewed from a bird's eye directly above. A case where the color correction information generation processing is performed for the point 4000 of the points forming the object 400 is explained specifically. It is assumed that the processing at S1400 to S1403 is performed and for the point 4000 of the object 400, the cameras having captured the image in which the corresponding pixel exists are the five cameras 112$f$ to 112$j$ painted in black.

As in the case with the color information generation procedure example, of the cameras having captured the image in which the corresponding pixel exists, the two cameras located on the outermost sides are selected. Here, the cameras located on the outermost sides refer to the cameras located at both ends in a circumferential direction in a case where the direction in which a plurality of cameras is adjacent to one another with the image capturing-target point 400 as a center is taken to be the circumferential direction. In the example in FIG. 15, the camera 112$f$ and the camera 112$j$ correspond to the two cameras located on the outmost sides. Here, in the case where the number of cameras having captured the image in which the corresponding pixel exists is two, the two cameras are selected.

Returning to FIG. 14. At S1408, based on the corresponding pixel existing in the image of the selected camera, color correction information on the object three-dimensional model is generated. In the case where only one corresponding pixel exists in the image of the camera, the pixel value of the corresponding pixel is generated as color correction information and in a case of a plurality of corresponding pixels exist in the image of the camera, the average value of the pixel values of the plurality of corresponding pixels is generated as color correction information. After this, the processing advances to S1409 and in a case where the processing for all the points of the three-dimensional shape data is completed, the loop processing at S1404 to S1409 is terminated and the color correction information generation processing is completed as a result. The color correction information generated at S1406 and S1408 is stored in association with the point at S1305 described above.

In the manner, the color correction information is stored as color correction information in which the RGB value, which is the pixel value of the corresponding pixel thus selected and the camera ID of the camera having captured the image in which the corresponding pixel exists are associated with each other. Here, the color correction information on the object three-dimensional model is information indicating color correction of each point of the object three-dimensional model and for example, as shown in FIG. 16, the RGB value and the camera ID are associated with the point of the object three-dimensional model and stored. Further, each point coordinate ID is an ID that is determined independently for each point in one frame. For example, to the points existing within one frame, the ID is given in an ascending order from 0. Further, the camera ID indicated by each point coordinate ID indicates the ID of the camera having captured the image used for generating the color correction information on the point. The color correction information on the object three-dimensional model indicates color information used for color correction of that point. As the color correction information on the camera ID and the object three-dimensional model, two pieces of information are stored in a case where the two cameras are selected and one piece of information is stored in a case where the one camera is selected. In the example in FIG. 15, color correction information 1 on the object three-dimensional model, which is first color correction information on the point 4000, is generated based on the pixel value of a corresponding pixel 441 existing in an image 440 of the camera 112*f*. Color correction information 2 on the object three-dimensional model, which is second color correction information, is generated based on the pixel value of a corresponding pixel 451 existing in an image 450 of the camera 112*j*.

In the present embodiment, although the above-described camera selection method is explained as an example, another method may be used and the method is not limited to the above-described camera selection method. For example, it may also be possible to select two cameras between which there is a difference in the value of the z-coordinate based on the camera position information, to select two cameras whose difference is large in accordance with the pixel values of the images of the cameras, and so on.

Further, although the case is explained where the number of selected cameras is two, the number of selected cameras is not limited two and the number of selected cameras may be three or more. Furthermore, although the case is explained where there is one corresponding pixel, there may be two or more corresponding pixels. For example, it may also be possible to store all the pixel values of the corresponding pixels as color correction information on the object three-dimensional model. It may also be possible to use a camera selection method of changing the number of selected cameras in accordance with the difference in the pixel value in such a manner that the larger the difference is, the more the cameras are selected and the smaller the difference is, the less the cameras are selected.

Further, although the method of storing the RGB value is explained as the storage method of the color information on the object three-dimensional model and the color correction information on the object three-dimensional model, another method may be used and the storage method is not limited to the above-described storage method. For example, it may also be possible to use a method in which Y, Cb, and Cr are stored as the color information on the object three-dimensional model and only the Y component of Y, Cb, and Cr is stored as the color correction information on the object three-dimensional model and only the change in luminance, such as reflection by the sunlight, is corrected.

As above, the method of storing the object three-dimensional model and the color information thereon in the DB 250 is described.

In the following, a method of generating a virtual viewpoint image by reading the object three-dimensional model, the color information thereon, and the color correction information thereon, which are stored, is described. That is, detailed configuration and operation of the backend server 270 are explained.

Configuration of Backend Server 270

Figure 17:
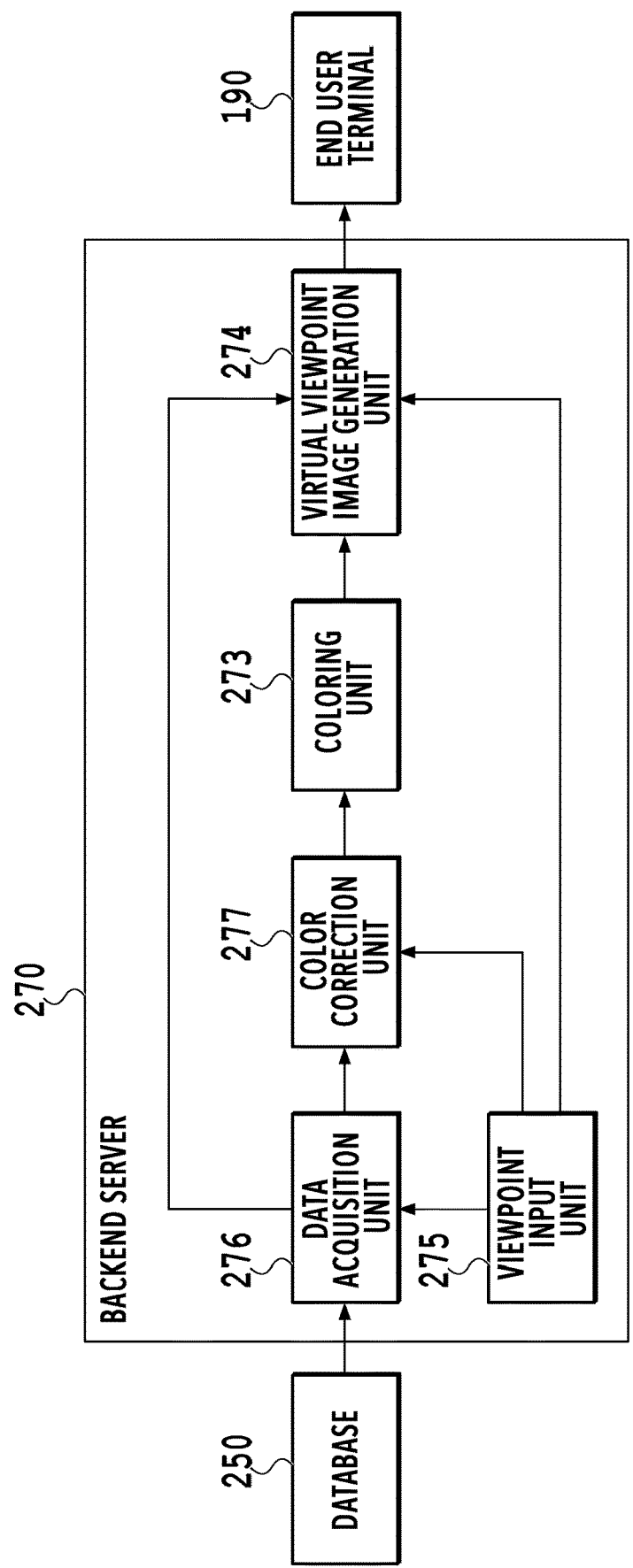
FIG. 17 is a block diagram showing a function configuration example of a backend server.

FIG. 17 is a block diagram showing a function configuration example of the backend server 270.

A viewpoint input unit 275 receives an input of virtual viewpoint information by a user, not shown schematically, via the end user terminal 190, the virtual camera operation UI 330, or the like. The viewpoint input unit 275 outputs the received virtual viewpoint information to a data acquisition unit 276, the virtual viewpoint image generation unit 274, and a color correction unit 277.

The data acquisition unit 276 acquires the object three-dimensional model, the color information thereon, and the color correction information thereon, which relate to an object estimated to be viewed from a virtual camera at a virtual viewpoint, which does not exist actually, from the DB 250 based on the input virtual viewpoint information. That is, the data acquisition unit 276 acquires the object three-dimensional model, the color information thereon, and the color correction information thereon, which relate to an object estimated to exist within the angle of view of a virtual camera arranged at a virtual viewpoint. The data acquisition unit 276 outputs the acquired data, that is, the object three-dimensional model, the color information thereon, and the color correction information thereon to the color correction unit 277. Further, the data acquisition unit 276 acquires a background image from the DB 250 and outputs the acquired background image to the virtual viewpoint image generation unit 274.

The color correction unit 277 corrects the color information on the object three-dimensional model based on the object three-dimensional model, the color information thereon, the color correction information thereon, and the virtual viewpoint information. Further, the color correction unit 277 outputs the color information on the object three-dimensional model after the correction to the coloring unit 273.

Here, color correction processing by the color correction unit 277 is explained with reference to FIG. 18.

The color correction unit 277 derives the position of the camera, for which each piece of information is to be generated, in accordance with the camera ID associated with the color information on the object three-dimensional model and the color correction information on the object three-dimensional model, and the camera parameters set in advance.

Figure 18:
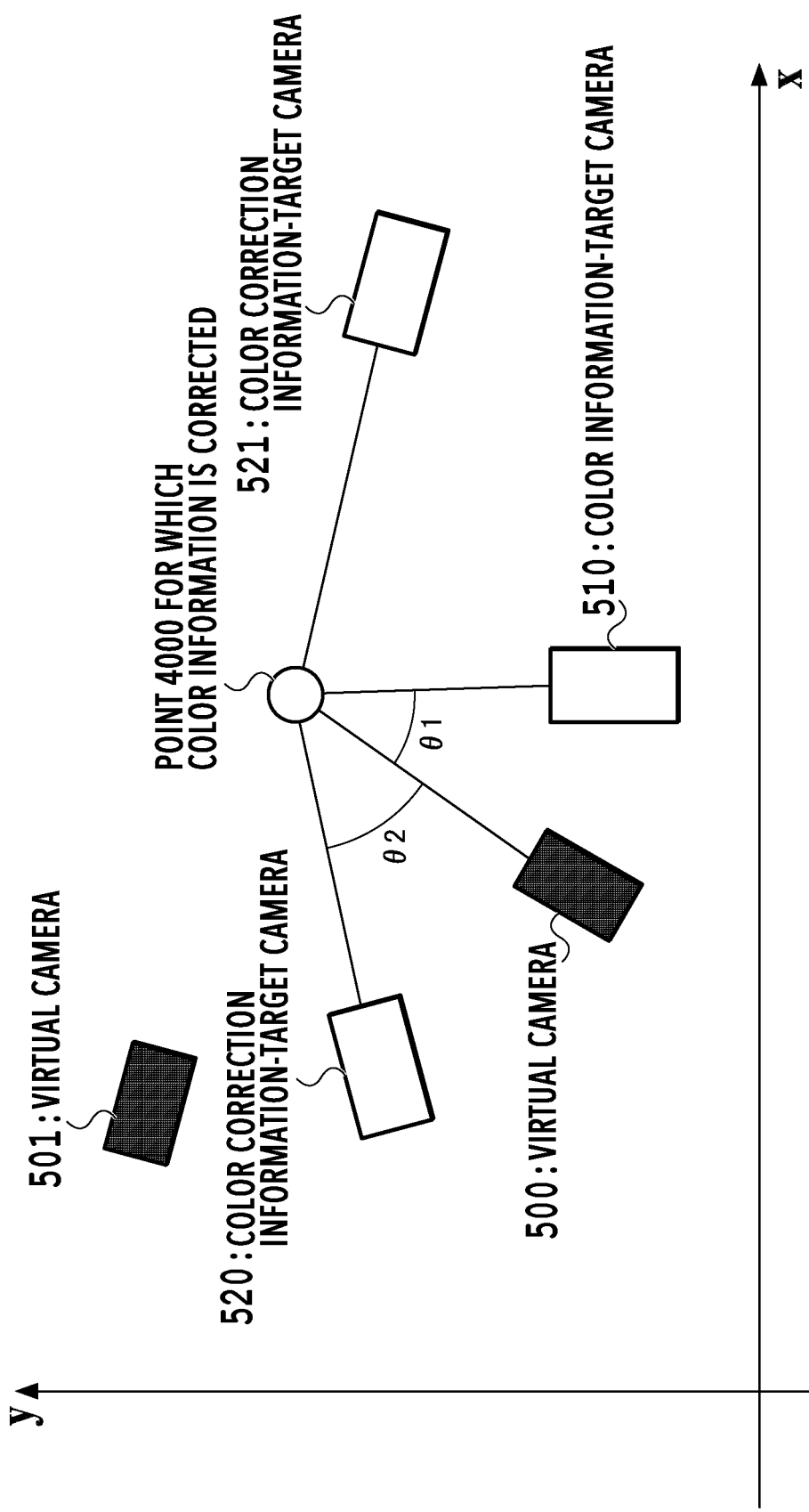
FIG. 18 is a diagram for explaining a color correction processing method.

FIG. 18 is a diagram for explaining a color correction processing method. Specifically, FIG. 18 shows a position relationship between the cameras having performed derivation and the point 4000 of the object and is a bird's-eye view of the cameras used for deriving the color information on the object three-dimensional model and the color correction information on the object three-dimensional model. Although the z-axis is also taken into account originally, here, for simplification, explanation is given on the x-y axis plane.

Here, an example is explained in which the point 4000 is taken as the target for which color information is corrected. It is assumed that the camera having captured the image that is the target for which color information is generated at the point 4000 is a camera (hereinafter, also called a color information-target camera) 510. Further, it is assumed that the cameras having captured the image that is the target for which color correction information is generated at the point 4000 are cameras (hereinafter, also called color correction information-target cameras) 520 and 521. Furthermore, it is assumed that the virtual cameras indicating the same position as the virtual viewpoint specified by a user are virtual cameras 500 and 501.

First, a case is explained where the virtual camera 500 is positioned between the color information-target camera 510 and the color correction information-target camera 520. That is, a case is explained where the virtual camera 500 is positioned within an area surrounded by the color information-target camera 510, the color correction information-target camera 520, and the point 4000.

An angle formed by the normal connecting the virtual camera 500 and the point 4000 and the normal connecting the color information-target camera 510 and the point 4000 is taken to be an angle θ1 and an angle formed by the normal connecting the virtual camera 500 and the point 4000 and the normal connecting the color correction information-target camera 520 and the point 4000 is taken to be an angle θ2. That is, the angle formed by the normal connecting the virtual camera 500 and the point 4000, which is the element of the object, and the image capturing direction of the color information-target camera 510 is taken to be the angle θ1, and the angle formed the normal and the image capturing direction of the color correction information-target camera 520 is taken to be the angle θ2.

Further, the color information is taken to be R1, G1, and B1 and the color correction information associated with the target camera 520 is taken to be R2, G2, and B2. In this case, color information RF, GF, and BF after correction is derived by operation equations (1) to (3) below.

[Mathematical equation 1]

$$R1'=R1\times\theta2/(\theta1+\theta2)+R2\times\theta1/(\theta1+\theta2) \qquad (1)$$

[Mathematical equation 2]

$$G1'=G1\times\theta2/(\theta1+\theta2)+G2\times\theta1/(\theta1+\theta2) \qquad (2)$$

[Mathematical equation 3]

$$B1'=B1\times\theta2/(\theta1+\theta2)+B2\times\theta1/(\theta1+\theta2) \qquad (3)$$

That is, in accordance with the magnitude of the angle formed by the normal connecting the virtual camera 500 and the point 4000 and the image capturing direction of the color information-target camera 510 and the magnitude of the angle formed by the normal and the image capturing direction of the color correction information-target camera 520, the weighting of the color information and the color correction information is set.

Further, like the virtual camera 501, in a case where the virtual camera is positioned at an angle outside the color correction information-target cameras 520 and 521 at the time of being viewed from the color information-target camera 510, color information is set as follows. That is, in a case where the virtual camera 501 is positioned in an area outside the area surrounded by the color correction information-target camera 520, the color correction information-target camera 521, and the point 4000, color information is set as follows. The color correction information associated with the color correction information-target camera 520 closest to the virtual camera 501 is taken to be color information after the correction. That is, R1'=R2, G1'=G2, and B1'=B2 are set.

The above correction processing is performed for all the points of the object three-dimensional model and the color information is corrected. Here, in a case where the color correction information is only the Y component, similarly as described above, it is sufficient to derive only the Y component based on the angle formed by the target camera. The reason is that in the appearance, the color (color difference) of the object does not change and the appearance depends on the intensity of the beam of light.

In the present embodiment, although the method that uses the angle is explained as an example of the color correction method, another method may be used and the method is not limited to the above-described color correction method. For example, it may also be possible to use a method of performing color correction in accordance with weighting by performing weighting by a distance between the point and the camera, and the like.

Virtual Viewpoint Image Generation Procedure Example

Next, the virtual viewpoint image generation procedure example performed in the backend server 270 is explained with reference to FIG. 19.

Figure 19:
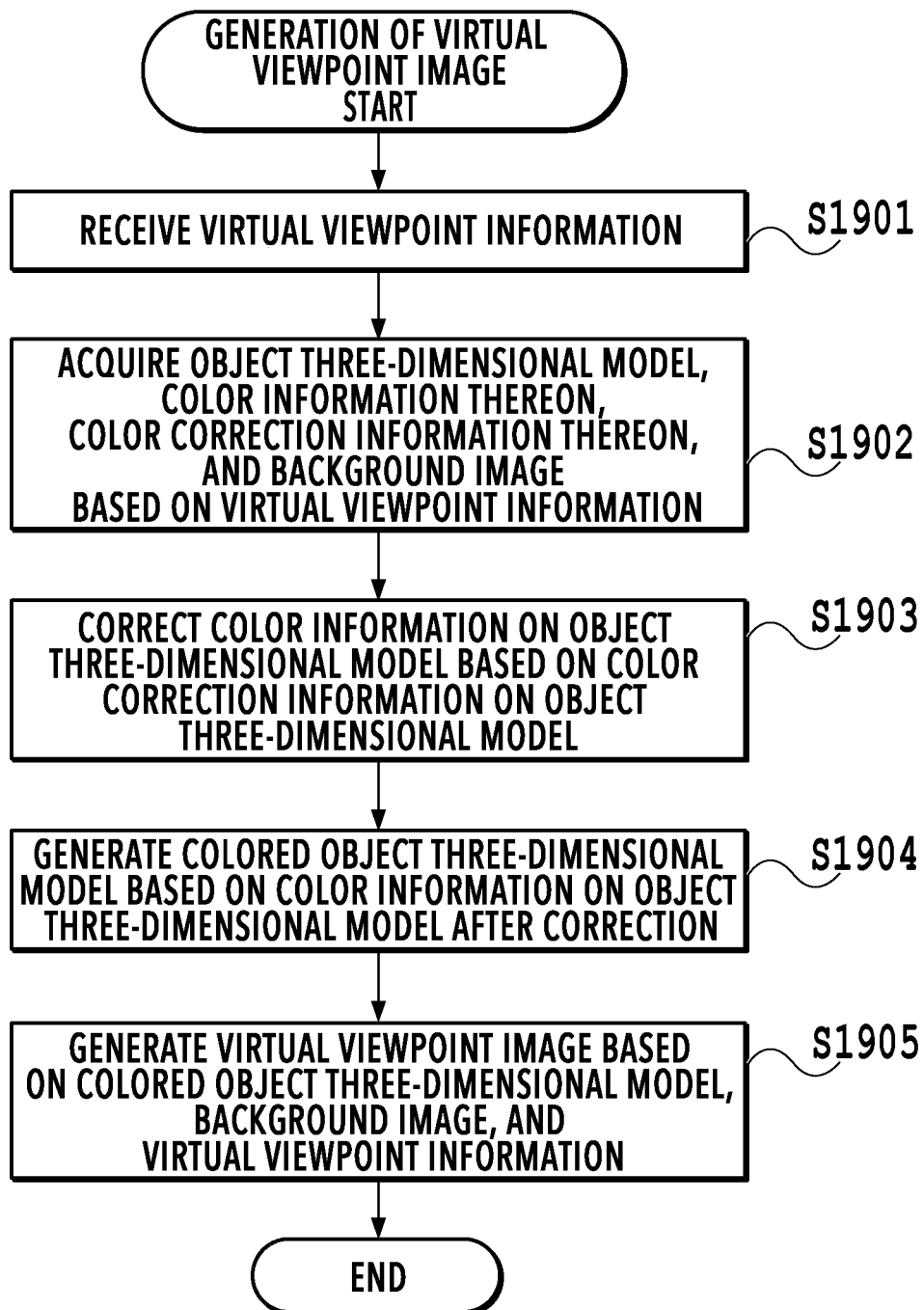
FIG. 19 is a flowchart showing a virtual viewpoint image generation procedure example.

FIG. 19 is a flowchart showing the virtual viewpoint image generation procedure example. In the following, in accordance with the flowchart, the flow of the processing is explained.

At S1901, the viewpoint input unit 275 receives an input of virtual viewpoint information by a user, not shown schematically, via the end user terminal 190 or the like. Then, the viewpoint input unit 275 outputs the received virtual viewpoint information to the data acquisition unit 276, the virtual viewpoint image generation unit 274, and the color correction unit 277.

At S1902, the data acquisition unit 276 acquires the object three-dimensional model, the color information thereon, and the color correction information thereon from the DB 250 based on the input virtual viewpoint information and outputs them to the color correction unit 277. Further, the data acquisition unit 276 acquires the background image from the DB 250 based on the input virtual viewpoint information and outputs the background image to the virtual viewpoint image generation unit 274. Specifically, based on the time specified by the virtual viewpoint information, the data acquisition unit 276 acquires and outputs the object three-dimensional model generated from the foreground image corresponding to the captured image at that time, the color information thereon, and the color correction information thereon. Further, based on the time specified by the virtual viewpoint information, the data acquisition unit 276 acquires and outputs the background image corresponding to the captured image at that time.

At S1903, the color correction unit 277 corrects the color information on the object three-dimensional model based on the input virtual viewpoint information, the color information on the object three-dimensional model, and the color correction information on the object three-dimensional model. Then, the color correction unit 277 outputs the object three-dimensional model and the color correction information on the object three-dimensional model to the coloring unit 273.

At S1904, the coloring unit 273 generates a colored object three-dimensional model by giving the color (pixel value) of the corresponding pixel to each point of the object three-dimensional model based on the input object three-dimensional model and the color information on the object three-dimensional model after the correction. Further, the coloring unit 273 outputs the colored object three-dimensional model to the virtual viewpoint image generation unit 274.

At S1905, as in the first embodiment, the virtual viewpoint image generation unit 274 generates a virtual viewpoint image based on the virtual viewpoint information, the background image, and the colored object three-dimensional model, which are input from each block.

From the above, according to the present embodiment, although the foreground image is not stored in the DB, the color correction information is stored, in addition to the color information on each element of the object three-dimensional model. Due to this, it is possible to generate a virtual viewpoint image by using the color information on the object three-dimensional model and the color correction information thereon, which are stored. As a result of this, it is made possible to obtain a virtual viewpoint image while reducing the amount of data to be stored in the DB, in addition to the image quality deterioration being suppressed.

For example, it is assumed that the number of cameras is 30, the image size is 3,840×2,160, the image format is 8-bit RGB, the number of points of the object three-dimensional model is 1,000,000, and the point coordinates of the model are represented by 32 bits.

With the conventional method, the size of the foreground image is 1,920×1,080×3×8×30=1,492,992,000 (bit)= 186.624 (MB).

According to the present embodiment, in place of the foreground image, the color information on the object three-dimensional model and the color correction information on the object three-dimensional model are generated. The size of the color information on the object three-dimensional model is 1,000,000×3×32=96,000,000 (bit)=12 (MB).

The size of the color correction information on the object three-dimensional model is 1,000,000×3×32×2=192,000, 000 (bit)=24 (MB).

The total of the color information on the object three-dimensional model and the color correction information on the object three-dimensional model is 36 (MB).

Consequently, according to the present embodiment, under the conditions described previously, it is possible to reduce the data size to about ⅕ of that in the conventional example.

Third Embodiment

An image processing system according to the present embodiment is explained below.

Hitherto, the method of storing a foreground image separated from a captured image of a camera is explained as the conventional example, the method of storing color information on an object three-dimensional model is explained as the first embodiment, and further, the method of storing color correction information on an object three-dimensional model is explained as the second embodiment.

In the present embodiment, a method of dynamically switching the above-described storage methods in accordance with the magnitude of the data amount is described. Due to this, it is made possible to store data of an appropriate data size in accordance with the restrictions on the write area to the DB.

First, each method described above is compared from the point of view of the image quality and the data size. With the method of storing a foreground image, which is the conventional example, the image quality is high and the data size is large. In contrast to this, with the method of storing only color information on an object three-dimensional model, which is the first embodiment, although the image quality is low, the data size is small. With the method of storing color correction information on an object three-dimensional model, which is the second embodiment, the image quality and the data size are those corresponding to middle points between the conventional example and the first embodiment.

Figure 20:
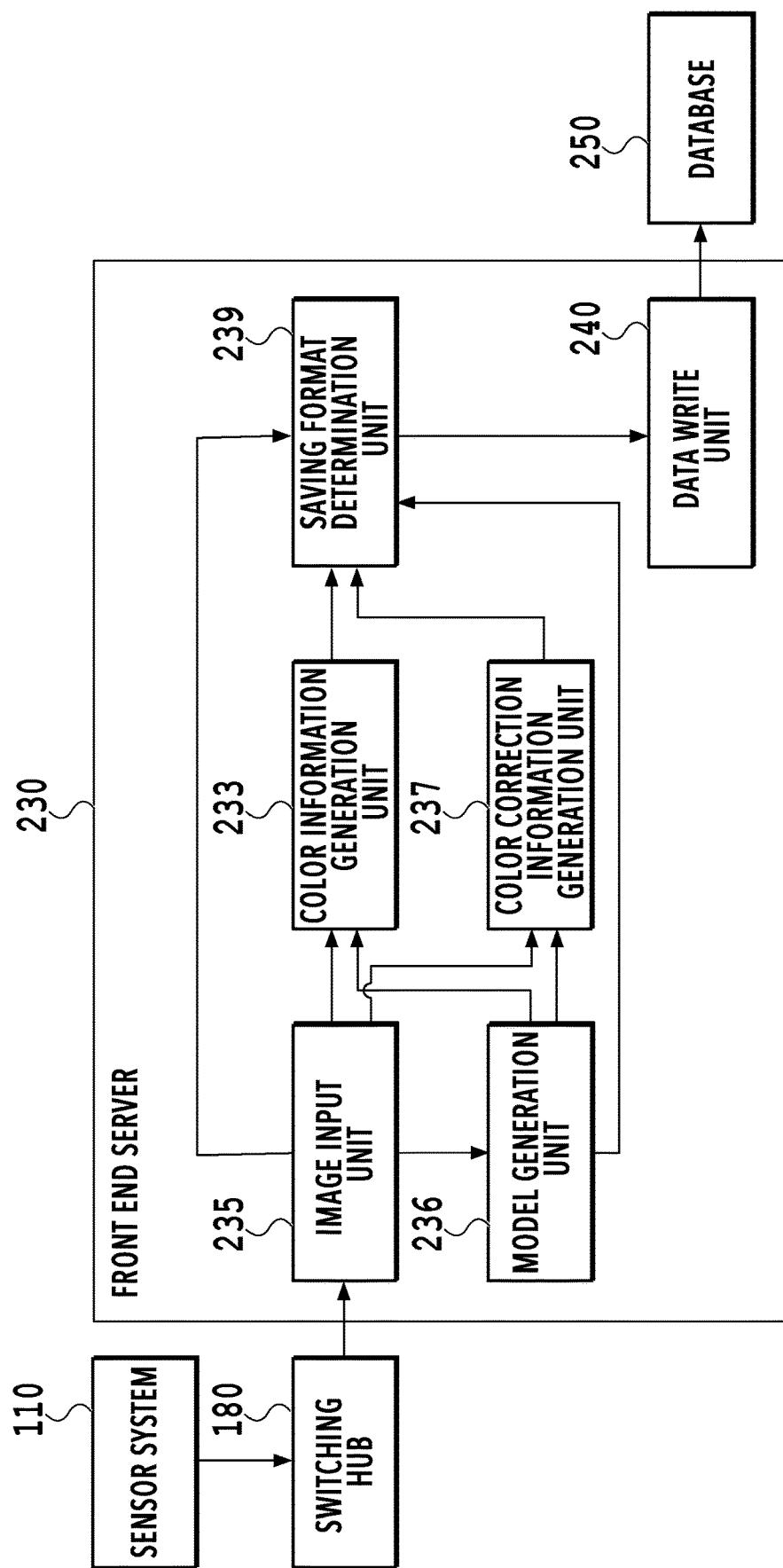
FIG. 20 is a block diagram showing a function configuration example of a front end server.

FIG. 20 is a block diagram showing a function configuration example of the front end server 230 in the present embodiment. In the present embodiment, the same symbol is Liven to the same block as that of the first and second embodiments and explanation thereof is omitted appropriately.

The functions of the image input unit 235, the model generation unit 236, the color information generation unit 233, and the color correction information generation unit 237 are the same as those of the front end server 230 shown in FIG. 12, and therefore, explanation thereof is omitted. The output destination of the function blocks 235, 236, 233, and 237 is changed from the data write unit to a saving format determination unit 239.

The saving format determination unit 239 compares the threshold value (reference value) set in advance and the data size of the input data, determines a saving format in accordance with comparison results, and outputs data to a data write unit 240 in the determined format.

Here, the saving format takes, for example, the following three formats.

(1) object three-dimensional model, background image, foreground image
(2) object three-dimensional model, background image, color information on object three-dimensional model, color correction information on object three-dimensional model
(3) object three-dimensional model, background image, color information on object three-dimensional model For example, it is assumed that the data size that can be written as data corresponding to one frame set in advance is 10 MB. In this case, it is assumed that priority is high in order of (1), (2), and (3) and the format that does not exceed the data size that can be written is selected. That is, the priority of (1), (2) and (3) satisfies the following relationship: the priority of (1)>the priority of (2)>the priority of (3). It is assumed that the data size of the object three-dimensional model is 5 MB, that of the foreground image is 10 MB, that of the background image is 1 MB, that of the color information on the object three-dimensional model is 1 MB, and that of the color correction information on the object three-dimensional model is 2 MB. In saving format (1), the object three-dimensional model, the foreground image, and the background image are written, and therefore, the total data size is 16 MB and this exceeds the threshold value 10 MB. In saving format (2), the object three-dimensional model, the background image, the color information on the object three-dimensional model, and the color correction information on the object three-dimensional model are written, and therefore, the total data size is 9 MB and is a numerical value smaller than the threshold value 10 MB. Consequently, saving format (2) is selected. The saving format determination unit 239 selects the relevant data from the input data in accordance with the selected saving format and outputs the selected data to the data write unit 240. In saving format (3), the object three-dimensional model, the background image, and the color information on the object three-dimensional model are written, and therefore, the total data size is 7 MB. Although the data size in saving form (3) is one that does not exceed the threshold value, the priority is low compared to that of saving format (2), and therefore, saving format (3) is not selected.

The data write unit 240 writes the data input from the saving format determination unit 239 to the DB 250. That is, in a case where the data size of the data input to the saving format determination unit 239 does not exceed the threshold value, the data write unit 240 writes the foreground image to the DB 250 and in a case where the data size of the data input to the saving format determination unit 239 exceeds the threshold value, the data write unit 240 does not write the foreground image to the DB 250.

From the above, according to the present embodiment, it is possible to write data in the optimum format in view of the data write area and it is possible to store the writable data of the highest image quality.

Following the above, the hardware configuration of each device configuring the present embodiment is explained in more detail. As described above, in the present embodiment, the example of the case is explained mainly where the front end server 230 implements hardware, such as FPGA and/or ASIC, and the hardware performs each piece of processing described above. This is also the same with the various devices within the sensor system 110, the camera adapter 120, the DB 250, the backend server 270, the time server 290, and the controller 300. Note that it may also be possible for at least one of the above-described devices to perform the processing of the present embodiment by software processing by using, for example, CPU, GPU, DSP, or the like.

Figure 21:
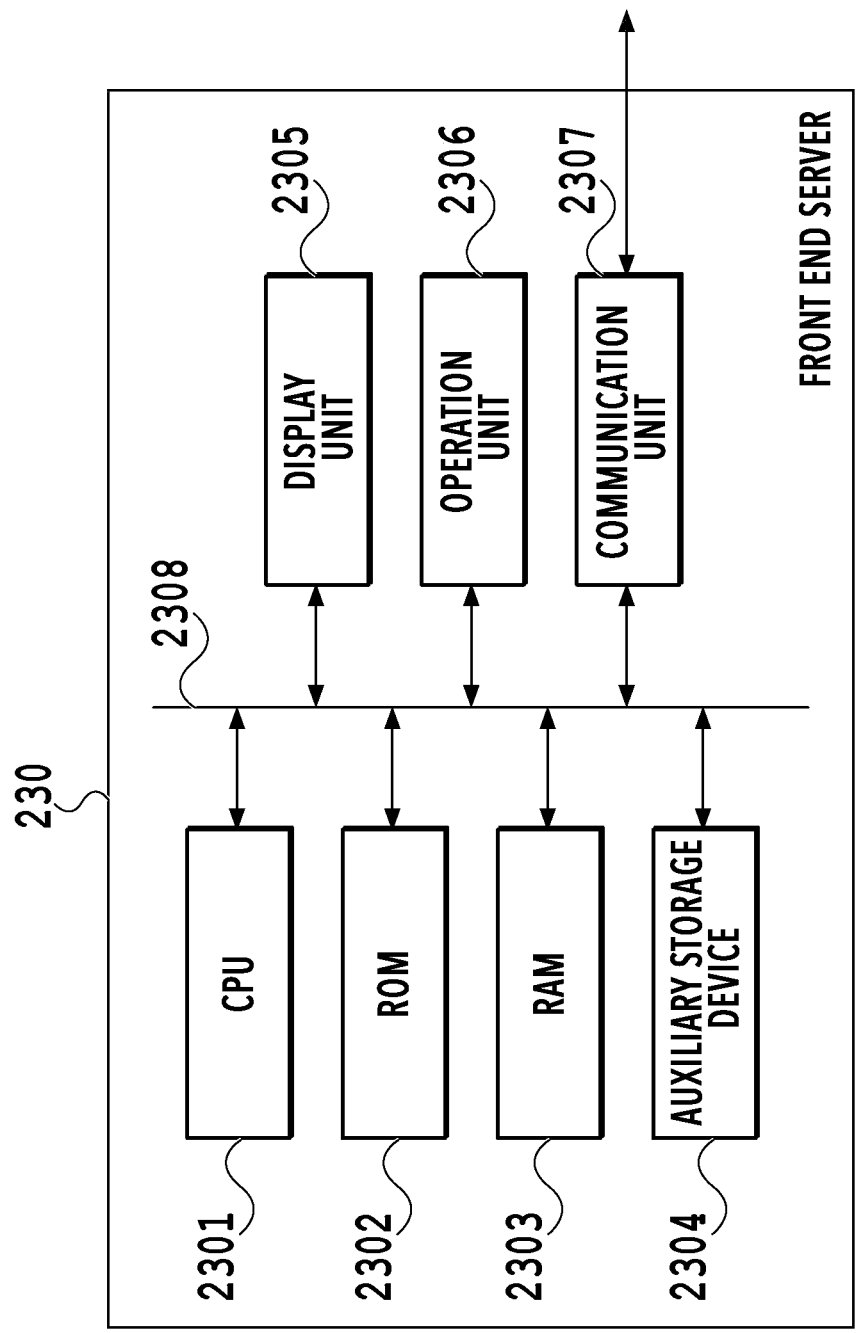
FIG. 21 is a diagram showing a hardware configuration example of the front end server.

FIG. 21 is a diagram showing a hardware configuration example of the front end server 230 for implementing the function configuration shown in FIG. 4 by software processing. The devices, such as the camera adapter 120, the DB 250, the backend server 270, the time server 290, the control station 310, the virtual camera operation UI 330, and the end user terminal 190, may be the hardware configuration in FIG. 21. The front end server 230 has a CPU 2301, a ROM 2302, a RAM 2303, an auxiliary storage device 2304, a display unit 2305, an operation unit 2306, a communication unit 2307, and a bus 2308.

The CPU 2301 controls the entire front end server 230 by using computer programs and data stored in the ROM 2302 or the RAM 2303. The ROM 2302 stores programs and parameters that do not need to be changed. The RAM 2303 temporarily stores programs and data supplied from the auxiliary storage device 2304, data supplied from the outside via the communication unit 2307, and the like. The auxiliary storage device 2304 includes, for example, a hard disk driver and the like and stores contents data of a still image and a moving image.

The display unit 2305 includes, for example, a liquid crystal display and the like, and displays a GUI (Graphical User Interface) for a user to operate the front end server 230, and the like. The operation unit 2306 includes, for example, a keyboard, a mouse, and the like and inputs various instructions to the CPU 2301 upon receipt of an operation by a user. The communication unit 2307 performs communication with an external device, such as the camera adapter 120 and the DB 250. For example, in a case where the front end server 230 is connected with an external device by wire, a LAN cable or the like is connected to the communication unit 2307. In a case where the front end server 230 has a function to perform wireless communication with an external device, the communication unit 2307 includes an antenna. The bus 2308 connects each unit of the front end server 230 and transmits information.

It may also be possible to perform, for example, part of the processing of the front end server 230 by FPGA and to implement another part of the processing by software processing using CPU. Further, it may also be possible to configure each component of the front end server 230 shown in FIG. 21 by a single electronic circuit, or by a plurality of electronic circuits. For example, it may also be possible for the front end server 230 to include a plurality of electronic circuits operating as the CPU 2301. By the plurality of electronic circuits performing the processing as the CPU 2301 in parallel, it is possible to improve the processing speed of the front end server 230.

Further, in the present embodiment, although the display unit 2305 and the operation unit 2306 exist inside the front end server 230, it may also be possible for the front end server 230 not to include at least one of the display unit 2305 and the operation unit 2306. Furthermore, at least one of the display unit 2305 and the operation unit 2306 may exist outside the front end server 230 as another device and the CPU 2301 may operate as a display control unit configured to control the display unit 2305 and as an operation control unit configured to control the operation unit 2306.

This is also the same with the other devices within the image processing system 100. Further, for example, it may also be possible for the camera adapter 120, the DB 250, the backend server 270, and the time server 290 not to include the display unit 2305 and for the control station 310, the virtual camera operation UI 330, and the end user terminal 190 to include the display unit 2305. In the above-described embodiment, the example of the case is explained mainly where the image processing system 100 is installed in a facility, such as a sports arena and a concert hall. As another example of the facility, mention is made of, for example, an amusement park, park, racetrack, bicycle racetrack, casino, pool, skate rink, ski resort, live house, and the like. Further, the event performed in various facilities may be one performed indoors or one performed outdoors. Furthermore, the facility in the present embodiment includes a facility constructed temporarily (during limited period).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory, computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is made possible to obtain a virtual viewpoint image while reducing the data amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-111163 filed Jun. 11, 2018, which is hereby incorporated by reference wherein in its entirety.

What is claimed is:

1. An image processing apparatus comprising:
one or more memories storing instructions; and
one or more processors executing the instructions to:
obtain three-dimensional shape data indicating a shape of an object generated based on a plurality of images captured from different directions by a plurality of image capturing devices;
generate color information for specifying a color of an element forming the generated three-dimensional shape data based on the generated three-dimensional shape data and the plurality of images;
generate, based on the generated three-dimensional shape data and the plurality of images, color correction information for correcting the color of the element in accordance with a position of a virtual viewpoint and a view direction from the virtual viewpoint by selecting two image capturing devices capturing a region corresponding to the element, wherein an angle formed by a line connecting one of the selected two image capturing devices and the object and a line connecting another of the selected two image capturing devices and the object is larger than an angle formed by a line connecting one of other pairs of image capturing devices capturing the region corresponding to the element and the object and a line connecting another of said other pairs of image capturing devices and the object; and
cause a storage unit to store the obtained three-dimensional shape data, the generated color information, and the generated color correction information in association with each other for generating a virtual viewpoint image corresponding to the virtual viewpoint.

2. The image processing apparatus according to claim 1, wherein the color information is generated based on a pixel value of a pixel of at least one of the plurality of images, which corresponds to an element forming the generated three-dimensional shape data.

3. The image processing apparatus according to claim 2, wherein the color information is generated based on an image captured by an image capturing device selected based on a distance between a point of the object corresponding to an element forming the obtained three-dimensional shape data and the image capturing device having captured an image including the point of the object.

4. The image processing apparatus according to claim 3, wherein the color information is generated based on an image captured by an image capturing device selected from two image capturing devices whose angles formed with a point of the object corresponding to an element forming the generated three-dimensional shape data are large compared to others of image capturing devices whose distance is the same.

5. The image processing apparatus according to claim 4, wherein the color information is generated based on an image captured by an image capturing device facing the object.

6. The image processing apparatus according to claim 3, wherein the color information is generated based on an image captured by an image capturing device whose priority given to an image capturing device is high, in a case where two or more image capturing devices have the same distance.

7. The image processing apparatus according to claim 2, wherein the color information is generated based on an average value of pixel values of a plurality of pixels is, in a case where there is the plurality of pixels of the image including the region corresponding to the element.

8. The image processing apparatus according to claim 1, wherein the color information is generated based on an average of pixel values of a plurality of pixels is determined as the color correction information, in a case where there is the plurality of pixels of the image corresponding to the point of the object.

9. The image processing apparatus according to claim 1, wherein foreground images generated from the plurality of images captured by the plurality of image capturing devices and including the object are not stored in the storage unit and a background image not including the object is stored in the storage unit.

10. The image processing apparatus according to claim 1, wherein the one or more processors further execute the instructions to:
generate a virtual viewpoint image corresponding to the virtual viewpoint based on the stored three-dimensional shape data, the stored color information, and the stored color correction information.

11. The image processing apparatus according to claim 10, wherein weighting of the color information and the color correction information is changed based on the virtual viewpoint.

12. The image processing apparatus according to claim 11, wherein, in a case where the virtual viewpoint is in an area surrounded by a generation-target image capturing device of each of the color information and the color correction information, and an element forming the three-dimensional shape data, weighting of the color information and the color correction information is set in accordance with a magnitude of an angle formed by a line connecting the virtual viewpoint and the point of the three-dimensional shape data and an image capturing direction of the generation-target image capturing device of each of the color information and the color correction information.

13. The image processing apparatus according to claim 11, wherein the colored three-dimensional shape data is generated by using the color correction information corresponding to a generation-target image capturing device of the color correction information, which is close to the virtual viewpoint, in a case where the virtual viewpoint is outside an area surrounded by the generation-target image capturing device of each of the color information and the color correction information and an element forming the three-dimensional shape data.

14. The image processing apparatus according to claim 1, wherein the three-dimensional shape data is represented by a point cloud.

15. The image processing apparatus according to claim 1, wherein the color correction information includes information for specifying colors of images captured by the selected image capturing devices and information for specifying positions of the selected image capturing devices and view directions from the selected image capturing devices.

16. The image processing apparatus according to claim 1, wherein the one or more processors further execute the instructions to select two image capturing devices for generating the color correction information, based on a position of the object, a position of an image capturing device, and a view direction from the image capturing device.

17. The image processing apparatus according to claim 1, wherein the color information and the color correction information are generated before the position of the virtual viewpoint and the view direction from the virtual viewpoint are specified.

18. The image processing apparatus according to claim 1, wherein,
in a case where there is no device other than an image capturing device for generating the color information that captures the region corresponding to the element, the color correction information is not generated.

19. The image processing apparatus according to claim 1, wherein,
in a case where there is an image capturing device that captures the region corresponding to the element as well as the image capturing device for generating the color information and the number of devices is equal to or less than two, the color correction information is generated with the image capturing devices equal to or less than two.

20. An image processing method comprising:
obtaining three-dimensional shape data indicating a shape of an object generated based on a plurality of images captured from different directions by a plurality of image capturing devices;
generating color information for specifying a color of an element forming the generated three-dimensional shape data based on the generated three-dimensional shape data and the plurality of images;
generating, based on the generated three-dimensional shape data and the plurality of images, color correction information for correcting the color of the element in accordance with a position of a virtual viewpoint and a view direction from the virtual viewpoint by selecting two image capturing devices capturing a region corresponding to the element, wherein an angle formed by a line connecting one of the selected two image capturing devices and the object and a line connecting another of the selected two image capturing devices and the object is larger than an angle formed by a line connecting one of other pairs of image capturing devices capturing the region corresponding to the element and the object and a line connecting another of said other pairs of image capturing devices and the object; and
storing the obtained three-dimensional shape data, the generated color information, and the generated color correction information in association with each other for generating a virtual viewpoint image corresponding to the virtual viewpoint.

21. A non-transitory computer readable storage medium storing a program for causing a computer to perform an image processing method comprising:
obtaining three-dimensional shape data indicating a shape of an object generated based on a plurality of images captured from different directions by a plurality of image capturing devices;
generating color information for specifying a color of an element forming the generated three-dimensional shape data based on the generated three-dimensional shape data and the plurality of images;
generating, based on the generated three-dimensional shape data and the plurality of images, color correction information for correcting the color of the element in accordance with a position of a virtual viewpoint and a view direction from the virtual viewpoint by selecting two image capturing devices capturing a region corresponding to the element, wherein an angle formed by a line connecting one of the selected two image capturing devices and the object and a line connecting another of the selected two image capturing devices and the object is larger than an angle formed by a line connecting one of other pairs of image capturing devices capturing the region corresponding to the element and the object and a line connecting another of said other pairs of image capturing devices and the object; and
storing the obtained three-dimensional shape data, the generated color information, and the generated color correction information in association with each other for generating a virtual viewpoint image corresponding to the virtual viewpoint.

* * * * *